United States Patent
Mifune et al.

(10) Patent No.: US 11,243,796 B2
(45) Date of Patent: Feb. 8, 2022

(54) MANAGEMENT APPARATUS, MANAGEMENT SYSTEM, METHOD FOR CONTROLLING MANAGEMENT APPARATUS, AND PROGRAM

(71) Applicant: NEC CORPORATION, Tokyo (JP)

(72) Inventors: Kazuma Mifune, Tokyo (JP); Masayuki Terao, Kanagawa (JP)

(73) Assignee: NEC CORPORATION, Tokyo (JP)

(*) Notice: Subject to any disclaimer, the term of this patent is extended or adjusted under 35 U.S.C. 154(b) by 314 days.

(21) Appl. No.: 16/470,076

(22) PCT Filed: Dec. 15, 2017

(86) PCT No.: PCT/JP2017/045063
§ 371 (c)(1),
(2) Date: Jun. 14, 2019

(87) PCT Pub. No.: WO2018/110694
PCT Pub. Date: Jun. 21, 2018

(65) Prior Publication Data
US 2019/0317798 A1    Oct. 17, 2019

(30) Foreign Application Priority Data
Dec. 16, 2016 (JP) .............................. JP2016-244490

(51) Int. Cl.
*G06F 9/455* (2018.01)
*G06F 13/42* (2006.01)

(52) U.S. Cl.
CPC ...... *G06F 9/45558* (2013.01); *G06F 13/4282* (2013.01); *G06F 2009/45579* (2013.01); *G06F 2213/0026* (2013.01)

(58) Field of Classification Search
None
See application file for complete search history.

(56) References Cited

U.S. PATENT DOCUMENTS 9,292,461 B2    3/2016   Katano et al.
9,384,060 B2 *  7/2016   Hunter ................. G06F 9/5077
(Continued)

FOREIGN PATENT DOCUMENTS

JP    2011-065551 A    3/2011
JP    2012-38157 A     2/2012
(Continued)

OTHER PUBLICATIONS

Office Action dated Jun. 23, 2020 in Japanese Application No. 2016-244490.
(Continued)

*Primary Examiner* — Kenneth Tang
(74) *Attorney, Agent, or Firm* — Sughrue Mion, PLLC

(57) ABSTRACT

A management apparatus includes: a data holding part that holds a function management table for storing information associating apparatus identification information identifying an expansion apparatus and function identification information for identifying a function that is set in the expansion unit; a function management part that specifies an expansion apparatus in response to an instruction to start up a virtual machine, that sets, in the expansion unit, function identification information corresponding to a function satisfying a functional requirement of the virtual machine, that sets the function satisfying the functional requirement as an internal function in the expansion unit, and that stores function identification information in the function management table; and a function setting part that determines driver software necessary for an internal function of the expansion apparatus based on function identification information set in the expansion unit.

17 Claims, 18 Drawing Sheets

(56) References Cited

U.S. PATENT DOCUMENTS

| | | | |
|---|---|---|---|
| 9,658,779 B2 | 5/2017 | Kawakami et al. | |
| 2012/0030442 A1* | 2/2012 | Nakanishi | G06F 3/0605 |
| | | | 711/163 |
| 2012/0179804 A1 | 7/2012 | Katanp et al. | |
| 2015/0378604 A1 | 12/2015 | Kawakami et al. | |
| 2017/0102874 A1* | 4/2017 | Ouchi | G06F 3/0631 |
| 2018/0123880 A1* | 5/2018 | Wen | G06F 13/4022 |
| 2018/0189109 A1* | 7/2018 | Nagai | G06F 9/5077 |

FOREIGN PATENT DOCUMENTS

| | | |
|---|---|---|
| JP | 2016-52044 A | 4/2016 |
| JP | 2016-133898 A | 7/2016 |
| WO | 2015/015592 A1 | 2/2015 |

OTHER PUBLICATIONS

International Search Report of PCT/JP2017/045063 dated Feb. 27, 2018.

\* cited by examiner

FIG. 11

| Byte Offset | Byte 3 | Byte 2 | Byte 1 | Byte 0 |
|---|---|---|---|---|
| 0h | Device ID | | Vendor ID | |
| 4h | Status Register | | Command Register | |
| 8h | Class Code (020000h) | | | |
| ... | ... | | | |
| 34h | Reserved | | | Cap_Ptr |
| 38h | Reserved | | | |
| 3Ch | Max_Latency (00h) | Min_Grant (FFh) | Interrupt Pin (01h) | Interrupt Line |

Offset 000h: PCI Header
Offset 040h: PCI Device-specific & New Capability register set
Offset 100h: Express Extended Configuration Space

FIG. 14

| MANAGEMENT NUMBER | Vendor-ID | Device-ID | Program-ID | PROGRAM DATA | FUNCTION INFORMATION | PERFORMANCE INFORMATION | STATUS INFORMATION |
|---|---|---|---|---|---|---|---|
| 0001 | 1001 | 0101 | 1000 | 1.hex | 2 | 10 | 1 |
| 0002 | 1002 | 0102 | 2000 | 2.hex | 1 | 40 | 0 |
| 0003 | 1003 | 0102 | 3000 | 3.hex | 4 | 20 | 0 |
| 0004 | 1004 | 0201 | 4000 | 4.hex | 1 | 10 | 1 |
| 0005 | 1005 | 0201 | 5000 | 5.hex | 2 | 10 | 0 |
| 0006 | 1006 | 0201 | 6000 | 6.hex | 1 | 10 | 0 |

MANAGEMENT APPARATUS, MANAGEMENT SYSTEM, METHOD FOR CONTROLLING MANAGEMENT APPARATUS, AND PROGRAM

CROSS-REFERENCE TO RELATED APPLICATIONS

The present application is a National Stage of International Application No. PCT/JP20171045063 (filed on Dec. 15, 2017), and claims priority from Japanese Patent Application No. 2016-244490 (filed on Dec. 16, 2016) the content of which are hereby incorporated in their entirety by reference into this specification.

The present invention relates to a management apparatus, a management system, a method for controlling the management apparatus, and a program.

BACKGROUND

A system that carried out information processing is expected to promptly start up and make operate an information processing apparatus that conforms with requirements. With the progress of virtualization technology, in a system that executes information processing by a general purpose server, rapid activation and flexible operation of the system have become possible by replacing a virtual machine and software in the virtual machine in accordance with processing requirements.

This virtualization in a general purpose server is becoming widely used in various fields such as the fields of networks, business, CAD (Computer Aided Design) usage, image processing, and the like. For example, virtualization in a general purpose server is used in network fields, and is widely used as Network Function Virtualization (NFV).

In NFV, functions of network equipment such as routers, gateways, firewalls, load balancers and the like, are implemented as application software operating on a general purpose Operating System (OS). By the general purpose operating system (OS) executing functions of network equipment on a virtualized server, the virtualized server substitutes for the function of dedicated network equipment (router, gateway, firewall, load balancer and the like).

Here, the general purpose server used in the abovementioned respective fields may have different processing requirements, in accordance with application purpose. For example, in the network equipment, necessary functions, such as control functions of input output speed, processing functions for passing packets, and the like, differ for each device. Therefore, even in a case where it is desired to change the application purpose of a general purpose server, in a case where the general purpose server does not satisfy necessary processing requirements, it is not possible to change the application purpose of the general purpose server.

Accordingly, an administrator or the like of a general purpose server may connect an add-in card using a PCIe (Peripheral Component Interconnect Express) standard interface, and perform function expansion of the general purpose server. In this case, by connecting an add-in card provided with a function suitable for an application purpose, the administrator of the general purpose server can use the general purpose server for the desired application purpose.

Patent Literature 1 (PTL 1) describes technology in which a PCI (Peripheral Component Interconnect) switch connects a PCI device and a management server in an exclusive possession state or a shared state, based on an instruction of the management server. In the technology described in Patent Literature 1, the management server obtains information related to type, performance, and functions necessary for performing management of the PCI device, from the PCI device connected via a PCI switch. As a result, the technology described in Patent Literature 1 facilitates the manager of the management server searching for a PCI device assigned to the management server.

PTL

Japanese Patent. Kokai Publication No. JP2011-065551A

SUMMARY

It is to be noted that the disclosure of the abovementioned cited literature is incorporated herein by reference thereto. The following analysis is given from a viewpoint of the present invention.

As described above, an administrator of a general purpose server may connect an add-in card using a PCIe standard interface, and perform function expansion of the general purpose server.

However, in a case of using an add-in card to perform function expansion of a general purpose server, the administrator of the general purpose server must perform add-in card addition, add-in card change, and the like. Specifically, the administrator of the general purpose server must perform operations such as turning off the power supply to the general purpose server, removing/inserting the add-in card, or the like.

In the technology described in Patent Literature 1, in a case of performing function expansion of a computer system, it is necessary to perform PCI device addition, PCI device change, or the like.

Therefore, it is an object of the present invention to provide a management apparatus, a management system, a method for controlling the management apparatus, and a program, which contribute to facilitating functional expansion.

According to a first aspect a management apparatus is provided. The management apparatus is connected to one or more expansion apparatuses in which an internal function can be changed, and to one or more virtual machines that use the internal function of the expansion unit(s).

The management apparatus is provided with a data holding part that holds a function management table for storing information associating apparatus identification information identifying the expansion apparatus(es) and function identification information for identifying a function that is set in the expansion unit(s).

The management apparatus is provided with a function management part that specifies an expansion apparatus used by the virtual machine(s) in response to an instruction to start up the virtual machine(s); that sets, in the expansion unit(s), function identification information corresponding to a function satisfying a functional requirement of the virtual machine(s); that sets the function satisfying the functional requirement as the internal function in the expansion unit(s), and that stores the function identification information in the function management table.

The management apparatus is provided with a function setting part that determines driver software necessary for an internal function of the expansion apparatus(es) based on function identification information set in the expansion unit(s).

According to a second aspect a management system is provided. The management system is configured to include 1 or more expansion apparatuses in which an internal function can be changed, 1 or more virtual machines that use the internal function of the expansion apparatus(es), and a management apparatus connected to the expansion apparatus and the virtual machine(s).

The expansion apparatus(es) is provided with a function expansion control part that includes a storage area for storing information for causing the expansion apparatus(es) to operate.

The expansion apparatus is provided with a function storage part in which a function executed by the expansion apparatus(es) is stored.

The management apparatus is provided with a data holding part that holds a function management table for storing information associating apparatus identification information identifying the expansion apparatus(es) and function identification information for identifying a function that is set in the expansion unit(s).

The management apparatus is provided with a function management part that specifies the expansion apparatus(es) used by the virtual machine in response to an instruction to start up the virtual machine; that sets, in the expansion unit(s), function identification information corresponding to a function satisfying a functional requirement of the virtual machine; that sets the function satisfying the functional requirement as the internal function in the expansion unit(s), and that stores the function identification information in the function management table.

The management apparatus is provided with a function setting part that determines driver software necessary for the internal function of the expansion apparatus(es) based on the function identification information set in the expansion unit(s).

According to a third aspect a method of controlling the management apparatus is provided. The management apparatus is connected to 1 or more expansion apparatuses in which an internal function can be changed, and to one or more virtual machines that use the internal function of the expansion unit(s).

The control method includes storing information associating apparatus identification information identifying the expansion apparatus(es) and function identification information for identifying a function that is set in the expansion unit(s).

The control method includes specifying an expansion apparatus used by the virtual machine(s), in response to an instruction to start up the virtual machine(s).

The control method includes setting the function identification information in the expansion unit(s), corresponding to a function satisfying a functional requirement of the virtual machine(s).

The control method includes setting a function satisfying the functional requirement in the expansion unit(s), as the internal function.

The control method includes storing the function identification information in the function management table.

The control method includes determining driver software necessary for the internal function of the expansion apparatus(es) based on the function identification information set in the expansion unit(s).

It is to be noted that the method is associated with a particular mechanism, known as a management apparatus connected to an expansion apparatus(es) and a virtual machine(s).

According to a fourth aspect a program is provided. The program causes execution by a management apparatus connected to 1 or more expansion apparatuses in which an internal function can be changed, and to one or more virtual machines that use the internal function of the expansion unit(s).

The program causes the management apparatus to execute processing to store information associating apparatus identification information identifying the expansion apparatus(es) and function identification information for identifying a function that is set in the expansion unit(s).

The program causes the management apparatus to execute processing to specify an expansion apparatus used by the virtual machine(s), in response to an instruction to start up the virtual machine(s).

The program causes the management apparatus to execute processing setting the function identification information corresponding to a function satisfying a functional requirement of the virtual machine(s), in the expansion unit(s).

The program causes the management apparatus to execute processing setting a function satisfying the functional requirement as the internal function, in the expansion unit(s).

The program causes the management apparatus to execute processing to store the function identification information in the function management table.

The program causes the management apparatus to execute processing to determine driver software necessary for the internal function of the expansion apparatus(es) based on the function identification information set in the expansion unit(s).

It is to be noted that this program may be recorded on a computer-readable storage medium. The storage medium may be non-transient such as semiconductor memory, a hard disk, a magnetic recording medium, an optical recording medium or the like. The present invention may be embodied as a computer program product.

According to the respective aspects, the invention provides a management apparatus, a management system, a method of controlling the management apparatus, and a program, which contribute to facilitating functional expansion, in a virtualized environment.

BRIEF DESCRIPTION OF DRAWINGS

FIG. 11 is a diagram showing an example of a data structure stored in a function expansion control part 313.

FIG. 14 is a diagram showing an example of a function management table 251.

PREFERRED MODES

Figure 1:
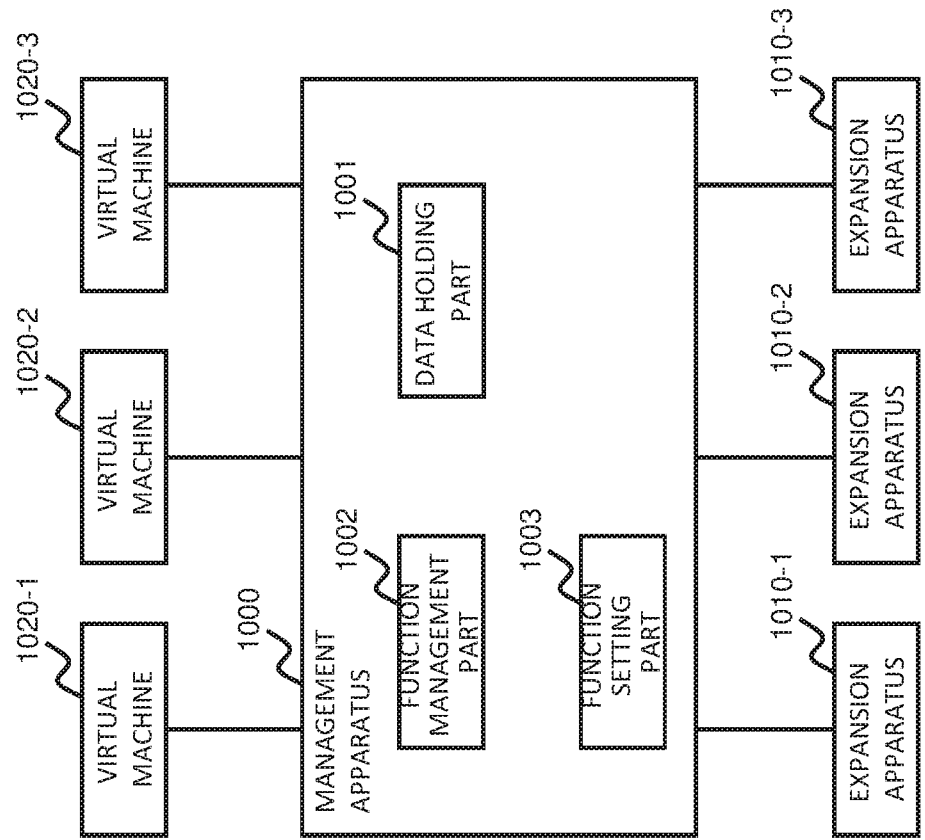
FIG. 1 is a diagram for describing an outline of an example embodiment.

First, a description is given concerning an outline of an example embodiment using FIG. 1. It is to be noted that reference symbols in the drawings attached to this outline are added to respective elements for convenience as examples in order to aid understanding, and there is no intention to limit the invention in any way. Connection lines between blocks in respective block diagrams may be bidirectional or unidirectional. Unidirectional arrows schematically show flow of main signals (data), but do not exclude bidirectionality.

As described above, a management apparatus is desired that contributes to facilitating function expansion in virtualized environments.

Accordingly, as an example, the management apparatus 1000 shown in FIG. 1 is provided. The management apparatus 1000 is connected to one or more expansion apparatuses (1010-1-1010-3) and to one or more virtual machines (1020-1-1020-3). It is to be noted that in the following description, the expansion apparatuses (1010-1-1010-3) and the virtual machines (1020-1-1020-3) are respectively denoted as expansion apparatus 1010 and virtual machine 1020 when there is no need to distinguish among them. FIG. 1 shows 3 expansion apparatuses (1010-1-1010-3) and 3 virtual machines (1020-1-1020-3), but there is no limitation to 3 expansion apparatuses 1010 and 3 virtual machines 1020. There may be 1 or 2, or 4 or more of the expansion apparatuses 1010 and virtual machines 1020.

The expansion apparatus 1010 is an apparatus in which an internal function can be changed. For example, the expansion apparatus 1010 may be an apparatus provided with a PCIe device in which an internal function can be changed.

The virtual machine 1020 operates by using an internal function of the expansion apparatus 1010.

The management apparatus 1000 is provided with a data holding part 1001, a function management part 1002 and a function setting part 1003.

The data holding part 1001 holds a function management table. The function management table stores information associating apparatus identification information identifying the expansion apparatus 1010 and function identification information for identifying a function that is set in the expansion apparatus 1010.

The function management part 1002 specifies the expansion apparatus 1010 used in the virtual machine 1020, in response to an instruction to start up the virtual machine 1020. The function management part 1002 sets the function identification information in the expansion apparatus 1010, corresponding to a function satisfying a functional requirement of the virtual machine 1020. The function management part 1002 sets a function satisfying a functional requirement in the expansion apparatus 1010, as an internal function of the expansion apparatus 1010. The function management part 1002 stores the function identification information that has been set in the expansion apparatus 101, in the function management table.

The function setting part 1003 determines driver software necessary for an internal function of the expansion apparatus 1010 on the basis of the function identification information that has been set in the expansion apparatus 1010.

The virtual machine 1020 may use an internal function of the expansion apparatus 1010, by using the driver software determined by the function setting part 1003.

A functional requirement changed in the management apparatus 1000. In this case, the function management part 1002 specifies function identification information, corresponding to a function satisfying a new functional requirement. The function management part 1002 sets the new function identification information in the expansion apparatus 1010. The function management part 1002 changes an internal function of the expansion apparatus 1010, by setting a function satisfying the new functional requirement. As a result, the manager of the management apparatus 1000 can change an internal function of the expansion apparatus 1010 without performing a task such as removing/inserting the expansion apparatus 1010.

The function setting part 1003 determines driver software necessary for the new internal function of the expansion apparatus 1010 on the basis of the new function identification information that has been set in the expansion apparatus 1010. As a result, the virtual machine 1020 can use the new internal function of the expansion apparatus 1010, by using the newly determined driver software.

The management apparatus 1000 can easily manage function identification information that is set in the expansion apparatus 1010, by the function management table associating and storing the apparatus identification information for identifying the expansion apparatus 1010 and the function identification information set in the expansion apparatus 1010.

From the above, the management apparatus 1000 contributes to facilitating functional expansion in a virtualized environment.

First Example Embodiment

A more detailed description is given concerning a first example embodiment, using the drawings. It is to be noted that in the following description the abovementioned management apparatus is called a management part.

Figure 2:
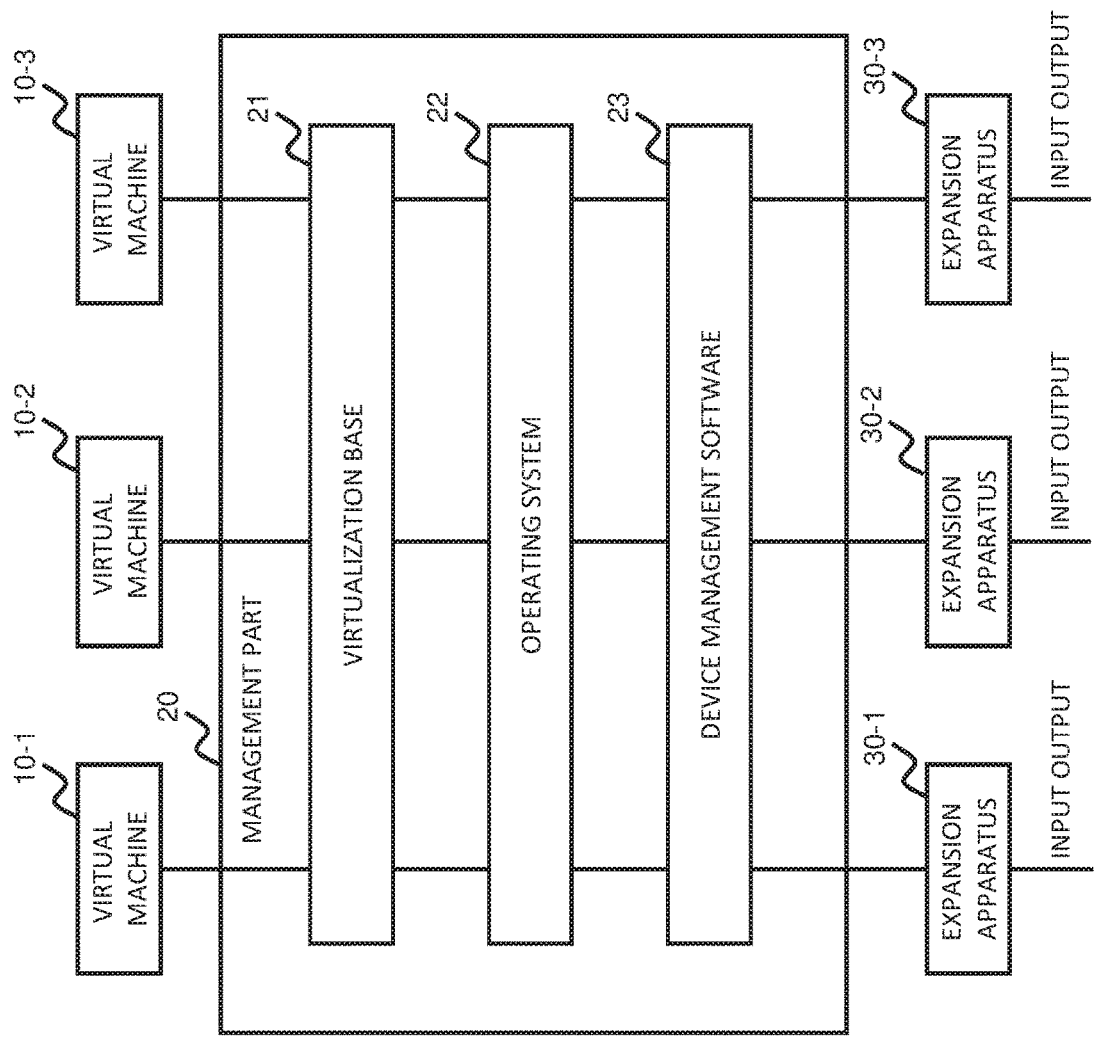
FIG. 2 is a block diagram showing an example of an overall configuration of a management system 1 according to a first example embodiment.

FIG. 2 is a block diagram showing an example of an overall configuration of a management system 1 according to the present example embodiment. The management system is configured to include virtual machines (10-1-10-3), a management part 20, and expansion apparatuses (30-1-30-3). It is to be noted that in the following description, the virtual machines (10-1-10-3) and the expansion apparatuses (30-1-30-3) are respectively denoted as virtual machine 10 and expansion apparatus 30, when there is no need to distinguish among them. FIG. 2 shows 3 virtual machines (10-1-10-3) and 3 expansion apparatuses (30-1-30-3), but there is no limitation to 3 virtual machines 10 and 3 expansion apparatuses 30. There may be 1 or 2, or 4 or more virtual machines 10 and expansion apparatuses 30. FIG. 2 is an example of the management system 1 according to the present example embodiment, but the management system 1 according to the present example embodiment is not limited to the configuration shown in FIG. 2.

The management part 20 is connected to one or more of the expansion apparatuses 30 in which an internal function can be changed, and to one or more of the virtual machines 10 that use the internal function of the expansion apparatuses 30. The control apparatus 20 is configured to include a virtualization base 21, an operating system 22, and device management software 23.

The virtualization base (or base physical structure) 21, for example, provides resources necessary for causing a plurality of the virtual machines 10 to operate on one server.

The operating system 22 activates and controls the virtual machine 10, in accordance with a control method provided by the virtualization base 21.

The device management software 23 performs management processing of an internal function of the expansion apparatus 30.

The expansion apparatus 30 is connected to the management part 20, and expands functionality executed by the virtual machine 10. For example, the expansion apparatus 30 may be an add-in card connected to the management part 20. Furthermore, the expansion apparatus 30 is provided with a PCIe device in which an internal function can be rewritten. In addition, the expansion apparatus 30 performs data input from outside the management system 1, and data output to outside the management system 1.

Figure 3:
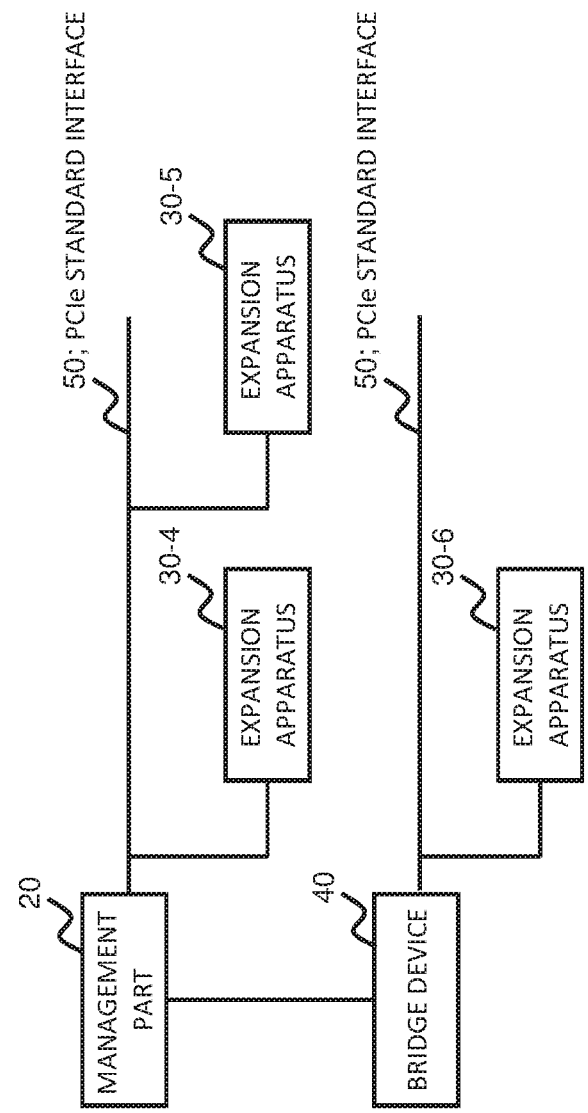
FIG. 3 is a block diagram showing an example of a connection of a management part 20 and an expansion apparatus 30.

FIG. 3 is a block diagram showing an example of a connection between the management part and the expansion apparatus 30.

The expansion apparatus 30 (30-4, 30-5 shown in FIG. 3) is connected to the management part 20 via a PCIe standard interface 50. The expansion apparatus 30 (30-6 shown in FIG. 3) is connected to the management part 20 via a bridge device 40.

Figure 4:
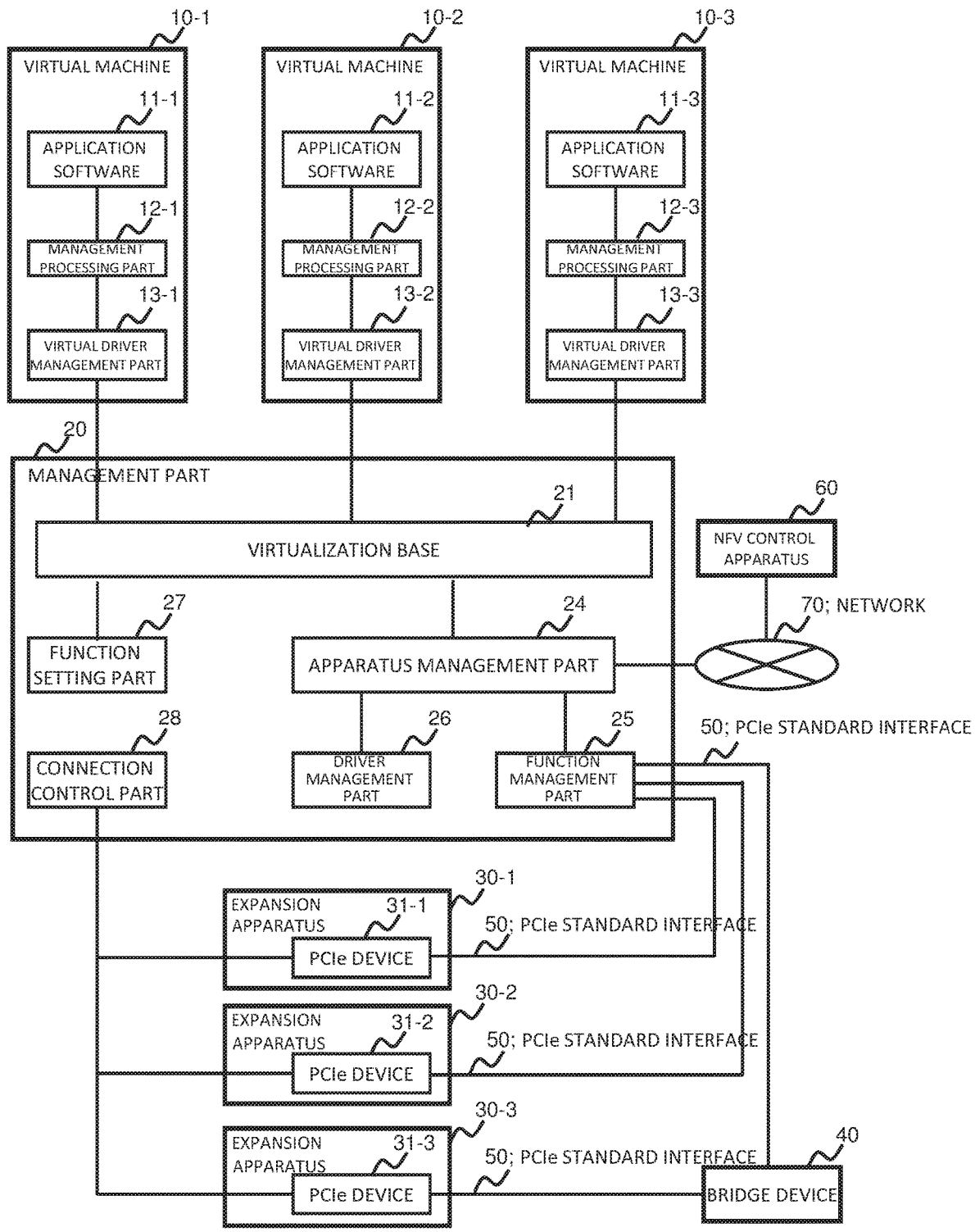
FIG. 4 is a block diagram showing an example of an overall configuration of a management system 1 according to the first example embodiment.

FIG. 4 is a block diagram showing an example of a more detailed overall configuration of a management system 1 according to the present example embodiment. FIG. 4 is an example of the management system 1 according to the present example embodiment, but the management system 1 according to the present example embodiment is not limited to the configuration shown in FIG. 4. FIG. 4 is an example of the virtual machine 10, the management part 20, and the expansion apparatus 30; and the virtual machine 10, the management part 20, and the expansion apparatus 30 according to the present example embodiment are not limited to configurations shown in FIG. 4.

The virtual machine 10-1 is provided with application software 11-1, a management processing part 12-1 and a virtual driver management part 13-1. Similarly, the virtual machines 10-2, 10-3 are provided with application software 11-2, 11-3, management processing parts 12-2, 12-3, and virtual driver management parts 13-2, 13-3. It is to be noted that in the following description, the application software (11-1-11-3), the management processing parts (12-1-12-3), and the virtual driver management parts (13-1-13-3) are respectively denoted as the application software 11, the management processing part 12, and the virtual driver management part 13, when there is no need to distinguish among them.

The management part 20 is configured to include a virtualization base 21, an apparatus management part 24, a function management part 25, a driver management part 26, a function setting part 27, and a connection control part 28. For example, the operating system 22 shown in FIG. 2 may implement the apparatus management part 24, the driver management part 26, the function setting part 27, and the connection control part 28, shown in FIG. 4. For example, the device management software 23 shown in FIG. 2 may implement functionality of the function management part 25 shown in FIG. 4.

The management part 20 is connected to an NFV control apparatus 60 via a network 70.

The expansion apparatus 30-1 is provided with a PCIe device 31-1. Similarly, the expansion apparatuses 30-2, 30-3 are provided with PCIe devices 31-2, 31-3.

(Virtual Machine 10)

Next, a detailed description is given concerning the virtual machine 10.

(Application Software 11)

The application software 11 is software to execute a function operating in the virtual machine 10. For example, the application software 11 may be a software program to implement a network function.

For example, the network function may be a routing control function (routing function) for the virtual machine 10 to transmit and receive information by connecting to the network 70. The network function may be a security function to monitor access. Or, the network function may be a communication quality control function for avoiding congestion.

(Management Processing Part 12)

The management processing part 12 performs setting for causing the virtual machine 10 to operate. Specifically, the management processing part 12 obtains various types of setting information for causing the virtual machine 10 to operate, from the apparatus management part 24 of the management part 20. Here, various types of information include information for identifying functions set inside the PCIe device 31, PCI pass-through information, a profile defining operation, configuration and the like of the virtual machine 10, boot image to activate the virtual machine 10. It is to be noted that in the following description, information identifying functions set within the PCIe device 31 is called function identification information. In the following description, the function identification information is also denoted as Program-ID.

Figure 5:
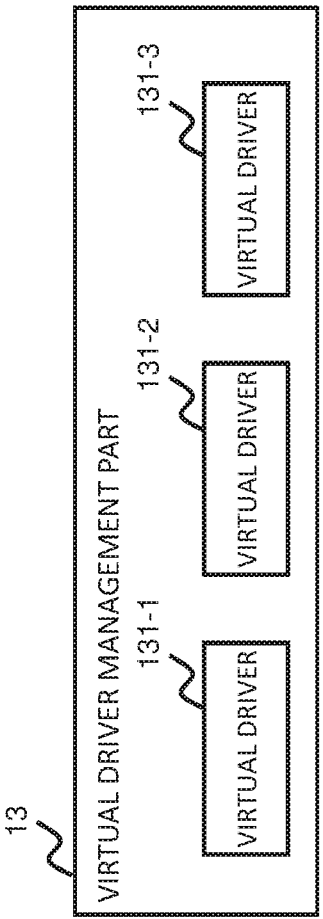
FIG. 5 is a block diagram showing an example of an internal configuration of a virtual driver management part 13.

The management processing part 12 transmits a message to control the driver software (virtual drivers (131-1-131-3) shown in FIG. 5) operating in the virtual machine 10, to the virtual driver management part 13, based on setting information obtained from the apparatus management part 24. For example, the management processing part 12 may transmit a message to the virtual driver management part 13 to cause virtual drivers (virtual drivers (131-1-131-3) shown in FIG. 5) to execute a network function with regard to the network 70, based on setting information obtained from the apparatus management part 24.

The management processing part 12 activates the application software 11, based on setting information obtained from the apparatus management part 24. For example, the management processing part 12 may activate the application software 11 required for a network function.

(Virtual Driver Management Part 13)

FIG. 5 is a block diagram showing an example of an internal configuration of the virtual driver management part 13. The virtual driver management part 13 is configured to include virtual drivers (131-1-131-3). It is to be noted that in the following description, the virtual drivers (131-1-131-3) are respectively denoted as virtual driver 131 when there is no need to distinguish among them. The virtual driver management part 13 shown in FIG. 5 is configured to include 3 virtual drivers (131-1-131-3), but the number of virtual drivers 131 is not limited to 3. There may be 1 or 2, or 4 or more of the virtual drivers 131 provided by the virtual driver management part 13.

The virtual driver management part 13 performs initial setting and function control in order for the virtual machine 10 to use the PCIe device 31. The management part 20 determines the virtual driver 131 to be set in the virtual driver management part 13, and sets the virtual driver 131 in the virtual driver management part 13. Details of processing in which the management part 20 determines the virtual driver 131 are described later.

The virtual driver 131 set in the virtual driver management part 13 is a program wherein the application software 11 of the virtual machine 10 uses a function set inside the PCIe device 31. For example, in a case where the application software 11 executes a network function, the function set in the PCIe device 31 may be a data encryption function, a quality assurance function, a protocol processing function, a failure monitoring function, or the like.

The virtual driver management part 13 uses the driver software provided by the management part 20 to perform control in accordance with respective PCIe devices 31. In the following description, the driver software provided by the management part 20, the driver software being for controlling internal functions of the respective PCIe devices 31 is called a control driver.

For example, the control driver may be stored in advance in a HDD (Hard Disk Drive) (not shown in the drawings) of the management part 20, or non-volatile memory such as flash memory (not shown in the drawings). The management part 20 may obtain the driver software from another device via the network 70, to be stored in a HDD (not shown in the drawings) of the management part 20, as a control driver.

(Management Part 20)

Next, a detailed description is given concerning e management part 20.

The apparatus management part 24 manages the entire management part and the virtual machine 10.

The function management part 25 manages a function set in the expansion apparatus 30. Specifically, the function management part 25 specifies the expansion apparatus 30 used in the virtual machine, in response to an instruction to start up the virtual machine 10. The function management part 25 sets, for function identification information, corresponding to a function satisfying a functional requirement, specified function identification information in the expansion apparatus 30, and sets a function satisfying a functional requirement in the expansion apparatus 30, as an internal function of the expansion apparatus 30.

More specifically, the function management part 25 specifies the PCIe device 31 of the expansion apparatus 30 used in the virtual machine, in response to an instruction to start up the virtual machine 10. The function management part 25 sets specified function identification information in the specified PCIe device 31, and sets a function satisfying a functional requirement in the PCIe device 31, as an internal function of the PCIe device 31.

The apparatus identification information may be a combination of information to identify a provider (manufacturer etc.) of the PCIe device 31 (denoted below also as Vendor-ID), and information identifying model number of the PCIe device 31 (denoted below also as Device-ID).

The driver management part 26 performs initial setting of the PCIe device 31. In a case where the PCIe device 31 is executing a function set in the PCIe device 31 in question, the driver management part 26 controls execution of the function.

The function setting part 27 determines driver software necessary for an internal function of the expansion apparatus 30 on the basis of the function identification information that has been set in the expansion apparatus 30. Specifically, the function setting part 27 determines driver software necessary for an internal function of the PCIe device 31 on the basis of the function identification information that has been set in the PCIe device 31.

The function setting part 27 creates a definition file required for activating the virtual machine 10. The apparatus management part 24 activates the virtual machine 10 based on the definition file created by the function setting part 27. Here, the file created by the function setting part 27 includes function identification information set in the expansion apparatus 30, to which the virtual machine 10 to be activated refers.

A connection control part 28 manages the physical implementation state of the PCIe device 31. The connection control part 28 manages power supply provided to the expansion apparatus 30, and electrical connectivity of the expansion apparatus 30 and the management part 20.

(Apparatus Management Part 24)

Below a detailed description is given concerning the apparatus management part 24.

Figure 6:
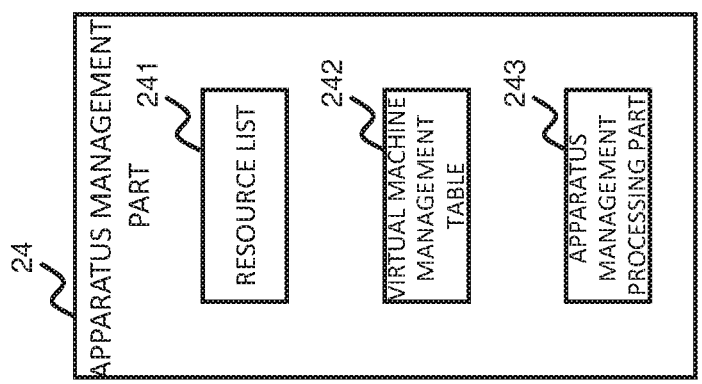
FIG. 6 is a block diagram showing an example of an internal configuration of an apparatus management part 24.

FIG. 6 is a block diagram showing an example of an internal configuration of the apparatus management part 24. The apparatus management part 24 is configured to include a resource list 241, a virtual machine management table 242, and an apparatus management processing part 243.

The resource list 241 stores information related to usage state (vacant resources) of configuration elements of the virtual machine 10. Specifically, the resource list 241 stores information related to usage state of a CPU (Central Processing Unit) of the virtual machine 10, usage state of memory, usage state of HDD, and the like.

The virtual machine management table 242 stores information related to operation and configuration of the virtual machine 10. Specifically, the virtual machine management table 242 stores a profile defining operations and configuration of the virtual machine 10, and boot image and status of the virtual machine 10 (information indicating activation and stoppage).

Below a detailed description is given concerning the apparatus management processing part 243.

First, the apparatus management processing part 243 receives a message instructing necessary functional requirements and performance requirements, and activation of the virtual machine 10 conforming to the functional requirements and performance requirements.

For example, the management system 1 uses the virtual machine 10 to implement a network function. In this case, the apparatus management processing part 243 may receive the functional requirements and performance requirements that are necessary for the network function to be implemented, from an NFV control apparatus 60 via the network 70. The apparatus management processing part 243 may receive a message instructing activation of the virtual machine 10, compatible with the network function to be implemented, from an NFV control apparatus 60 via the network 70.

The apparatus management processing part 243 extracts the functional requirements and performance requirements from the received message, and calculates various types of resource that are necessary. Specifically, the apparatus management processing part 243 determines the functional requirements and performance requirements necessary for the virtual machine 10 to be activated, based on the resource list 241 and a result of calculating resources.

Here, a functional requirement necessary for the virtual machine 10 is a requirement for executing a program, satisfying a functional requirement extracted from the received message. For example, the management system 1 uses the virtual machine 10 to implement a network function. In this case, the functional requirement necessary for the virtual machine 10 is a requirement for executing the program, implementing a data encryption function, a line quality assurance function (QoS; Quality of Service), a protocol processing function, and the like.

Here, a performance requirement necessary for the virtual machine 10 is a requirement related to the performance of the virtual machine 10, satisfying a designated functional requirement. For example, the performance requirement necessary for the virtual machine 10 may be information related to the number of CPU cores, memory capacity, disk capacity, processing speed, processing quality and the like. In a case where the management system 1 provides a network function to a user according to billing amount, the performance requirement necessary for the virtual machine 10 may include information related to the billing credit limit.

The apparatus management processing part 243 queries the function management part 25 with regard to presence or absence of the PCIe device 31 satisfying the determined functional requirements and performance requirements.

Here, it is assumed that the PCIe device 31 satisfying the determined functional requirements and performance requirements has not been found. In this case, the apparatus management processing part 243 stops activation of the virtual machine 10. The apparatus management processing part 243 transmits a message to the NFV control apparatus 60 that activation of the virtual machine 10 is stopped, and a reason for the stoppage.

On the other hand, it is assumed that the PCIe device 31 satisfying the determined functional requirements and performance requirements has been found. In this case, the apparatus management processing part 243 transmits to the function management part 25 a message instructing activation of the PCIe device 31 that has been found, and setting the PCIe device 31 to be usable by the virtual machine 10.

The function management part 25 executes processing to set the PCIe device 31, based on an instruction from the apparatus management processing part 243. The function management part 25 sets function identification information, identifying a function set inside the PCIe device 31, in the PCIe device 31.

The function management part 25 notifies the apparatus management processing part 243 of completion of setting of the PCIe device 31. The function management part 25 notifies the apparatus management processing part 243 of function identification information set in the PCIe device 31. Details of the function management part 25 are described later.

The apparatus management processing part 243 receives a message from the function management part 25 giving notification of completion of setting of the PCIe device 31. The apparatus management processing part 243 receives the function identification information set in the PCIe device 31.

The apparatus management processing part 243 refers to the virtual machine management table 242 and creates a definition file necessary for activating the virtual machine 10. The definition file created by the apparatus management processing part 243 includes settings for the PCIe device 31 to be used by the virtual machine 10. Specifically, the definition file created by the apparatus management processing part 243 may include function identification information set in the PCIe device 31, PCI pass-through setting, a profile defining operation and configuration of the virtual machine 10, boot image of the virtual machine 10, and the like.

When creation of the definition file is completed, the apparatus management processing part 243 activates the virtual machine 10 via the virtualization base 21.

When activation of the virtual machine 10 is completed, the apparatus management processing part 243 transmits initial setting information and the definition file, to the management processing part 12 of the virtual machine 10. Here, the processing setting information is information that includes identification number for identifying an apparatus including the management part 20, IP (Internet Protocol) address, and the like.

(Function Management Part 25)

Next, a detailed description is given concerning the function management part 25.

Figure 7:
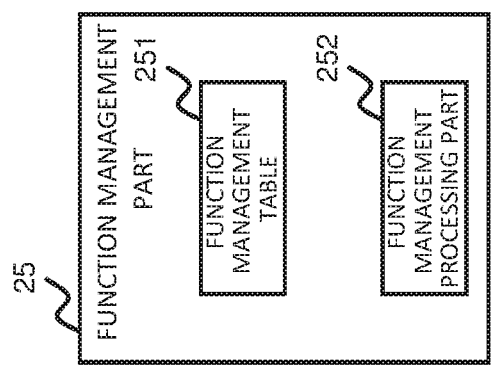
FIG. 7 is a block diagram showing an example of an internal configuration of a function management part 25.

FIG. 7 is a block diagram showing an example of an internal configuration of the function management part 25. The function management part 25 is configured to include a function management table 251 and a function management processing part 252.

The function management table 251 stores information associating apparatus identification information identifying the expansion apparatus 30 and function identification information for identifying a function that is set in the expansion apparatus 30. For example, the function management table 251 may be configured to include apparatus identification information of the PCIe device 31 and function identification information of the PCIe device 31.

Here, the function management table 251 may associate a plurality of function identification information items with one apparatus identification information item, and perform storage thereof. Specifically, the function management table 251 may associate a plurality of function identification information items with one set of Vendor-ID and Device-ID, and perform storage thereof.

The function management table 251 may additionally associate function identification information, title of program data, and function information indicating processing in which the program data is executed, with apparatus identification information, and perform storage thereof.

The function management table 251 may additionally associate apparatus identification information, function identification information, title of program data, performance information, function information, and information indicating usage state (below referred to as status information), and perform storage thereof.

Performance information is information indicating required performance, with respect to processing of corresponding program data. For example, values indicating details of required performance and values indicated by the performance information may be associated and stored in a HDD (not shown in the drawings) of the management part 20. For example, values indicating details of required performance may be the number of CPU cores, memory capacity, disk capacity, and the number of data bits that can be processed in 1 second. The function management table 251 stores performance information corresponding to processing of program data of each PCIe device 31.

Performance information is information indicating processing executed with corresponding program data. For example, types of processing and values indicated by function information may be associated and stored in a HDD (not shown in the drawings) of the management part 20. For example, values such as: data encryption function=1, line quality assurance function=2, protocol processing function=4, and the like, may be assigned in advance as function information. The function management table 251 stores function information corresponding to processing of program data of each PCIe device 31.

The status information is information indicating whether or not the PCIe device 31 is in a state of being used by the virtual machine 10.

The function management processing part 252 refers to the function management table 251 to specify function information satisfying designated functional requirements. The function management processing part 252 specifies the expansion apparatus 30 based on the apparatus identification information corresponding to the function information. The function management processing part 252 sets the specified function identification information and a function satisfying functional requirements in the expansion apparatus 30.

The function management processing part 252 may refer to the function management table 251 to specify the function information and the performance information satisfying the designated functional requirement and performance requirement. The function management processing part 252 may specify the expansion apparatus 30 based on the apparatus identification information corresponding to the designated function information and the performance information. The function management processing part 252 may set the specified function identification information and a function satisfying functional requirements in the expansion apparatus 30.

The function management processing part 252 may modify, add or delete the function identification information, the program data title, performance information, and function information, in the function management table 251. Furthermore, in the function management table 251, in a case indicating that status information is in an in-use state, the state may be such that the function identification information, the program data title, performance information, and function information are not set.

Below a more detailed description is given concerning the function management processing part 252.

In a case of receiving a query related to presence or absence of the PCIe device 31 satisfying a functional requirement and performance requirement, from the apparatus management processing part 243, the function management processing part 252 extracts the functional requirement and the performance requirement from the received query.

The function management processing part 252 refers to the function management table 251, and searches for function information and performance information conforming to the extracted functional requirement and performance requirement. The function management processing part 252 refers to the function management table 251, and determines whether or not a PCIe device 31 is recorded that conforms to the extracted functional requirement and performance requirement, and is not used by the virtual machine 10.

In a case where the PCIe device 31 is recorded in the function management table 251, the function management processing part 252 judges that a PCIe device 31 satisfying the functional requirement and performance requirement, is present. On the other hand, in a case where the PCIe device 31 is not recorded in the function management table 251, the function management processing part 252 judges that a PCIe device 31 satisfying the functional requirement and performance requirement, is not present.

The function management processing part 25:2 notifies the apparatus management part 24 with regard to the presence or absence of the PCIe device 31 satisfying the functional requirement and performance requirement.

The function management processing part 252 transmits a message from the apparatus management processing part 243 instructing activation of the PCIe device 31 satisfying the functional requirement and the performance requirement, and a setting that the PCIe device 31 is usable by the virtual machine 10.

The function management processing part 252 confirms that a control driver is not operating, before setting of the PCIe device 31. In a case where the control driver is operating, the function management processing part 252 transmits a message to a driver management part 26 with an instruction to stop operation of the control driver. This is in order to avoid the occurrence of an unnecessary access error or system error. In order to avoid an access error or system error, the function management processing part 252 may transmit a message to a driver management part 26 to instruct the virtual driver 131 to stop.

With the virtual machine 10 using the PCIe device 31, in a case where downloading or updating of a function of the PCIe device 31 is necessary, the function management processing part 252 transmits a message with an instruction to download or update a function, to the PCIe device 31 that is to be set.

The function management processing part 252 sets the predefined function identification information "Program-ID" in the PCIe device 31.

For example, the function management processing part 252 may randomly define function identification information. The NFV control apparatus 60 may define the function identification information when an instruction is given to start up the virtual machine 10.

The function management processing part 252 defines the function identification information in an empty area for function expansion, in the PCIe device 31. Specifically, the function management processing part 252 sets function identification information in an area assigned as Reserved in the PCI standard.

In a case where setting of the function identification information for the PCIe device 31 is completed, the function management processing part 252 updates status information for the PCIe device 31 to "in use", in the function management table 251.

In a case where it is necessary to perform hot plugging on the PCIe device 31 by the management part 20, the function management processing part 252 instructs the function setting part 27 to execute hot plugging on the PCIe device 31. Details of the function setting part 27 are described later.

For example, in a case where the management part 20 downloads or updates a function set in the PCIe device 31, the function management processing part 252 instructs the function setting part 27 to execute hot plugging on the PCIe device 31. It is to be noted that the management part 20 may execute hot plugging and re-activate the operating system 22. This is a process for re-identifying the PCIe device 31.

The function management processing part 252 receives a message from the function setting part 27 giving notification of hot plugging and completion of setting of the control driver. In a case of receiving the message, the function management processing part 252 transmits a message to the apparatus management part 24 giving notification of completion of setting of the PCIe device 31. The function management processing part 252 transmits the function identification information set in the PCIe device 31.

(Driver Management Part 26)

Next, a detailed description is given concerning the driver management part 26.

Figure 8:
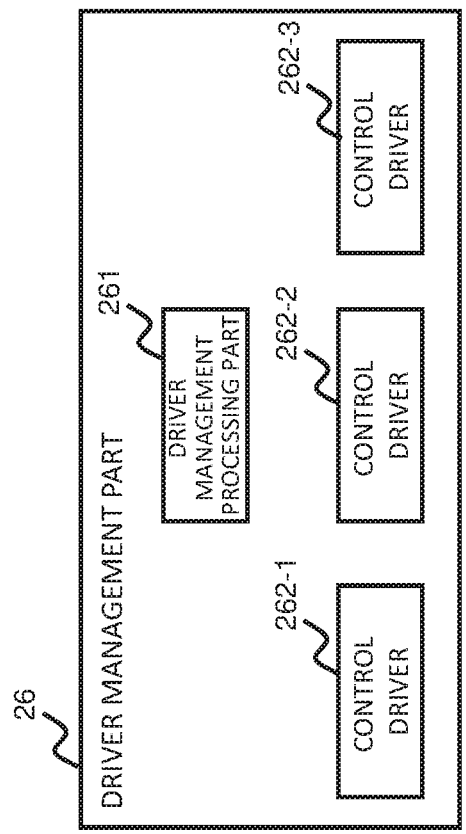
FIG. 8 is a block diagram showing an example of an internal configuration of a driver management part 26.

FIG. 8 is a block diagram showing an example of an internal configuration of the driver management part 26. The driver management part 26 is configured to include a driver management processing part 261, and control drivers (262-1-262-3). It is to be noted that in the following description, the respective virtual drivers (262-1-262-3) are denoted as virtual driver 262 when there is no need to distinguish among them. It is to be noted that in FIG. 8 the configuration includes 3 control drivers (262-1-262-3), but the number of control drivers 262 provided by the driver management part 26 is not limited to 3. There may be 1 or 2, or 4 or more of the control drivers 262 provided by the driver management part 26.

It is to be noted that the function setting part 27 sets the control driver 262 in the driver management part 26. Therefore, the driver management part 26 shown in FIG. 8 indicates a state after the function setting part 27 sets the control driver 262.

For the function management processing part 252, before setting of the PCIe device 31, in a case where the control driver 262 is operating, the driver management processing part 261 receives a message from the function management part 25 with an instruction to stop operation of the control driver 262. Additionally, the driver management processing part 261 may receive a message from the function management part 25 with an instruction to stop operation of the virtual driver 131.

The driver management processing part 261, on receiving a message with an instruction to stop operation of the control driver 262, stops operation of the control driver 262. The driver management processing part 261, on receiving a message from the function management part 25 with an instruction to stop operation of the virtual driver 131, stops operation of the virtual driver 131.

The control driver 262 is a program for the virtual machine 10 to use a function set in the PCIe device 31, with the virtual machine 10 and the PCIe device 31 as intermediaries.

(Function Setting Part 27)

Next, a detailed description is given concerning the function setting part 27.

Specifically, the function setting part 27 determines a first driver (virtual driver 131) set in the virtual machine 10, based on function identification information, set in the expansion apparatus 30 satisfying a functional requirement. The function setting part 27 determines a second driver (control driver 262) that enables the virtual machine 10 to use an internal function of the expansion apparatus 30, based on function identification information, set in the expansion apparatus 30 satisfying a functional requirement.

The virtual driver 131 and the control driver 262 may be determined based on function identification information and apparatus identification information, set in the expansion apparatus 30 satisfying a functional requirement and a performance requirement.

Below, a more detailed description is given concerning the function setting part 27.

The function setting part 27 receives a message from the function management part 25 giving an instruction to execute hot plugging with the PCIe device 31. On receiving the message with an instruction to execute hot plugging with the PCIe device 31, the function setting part 27 gives an instruction to the connection control part 28 to execute hot plugging.

In a case where the operating system 22 of the management part 20 is activated, the function setting part 27 executes hot plugging with the PCIe device 31, and reads apparatus identification information of the PCIe device 31 and function identification information set in the PCIe device 31, from the PCIe device 31. Specifically, in a case where the operating system 22 of the management part 20 is activated, the function setting part 27 reads Vendor-ID, Device-ID, Program-ID from the PCIe device 31.

On the other hand, in a case where the operating system 22 of the management part 20 is not activated, the function management part 25 reads apparatus identification information of the PCIe device 31 connected to the management part 20 and function identification information set in the PCIe device 31, from the PCIe device 31. Specifically, the function management part 25 reads Vendor-ID, Device-ID and Program-ID from the PCIe device 31. The function management part 25 gives notification of the apparatus identification information that has been read and the function identification information that has been read, to the function setting part 27.

It is to be noted that a case where the operating system 22 of the management part 20 is not activated, relates, for example, to a case where a function of the PCIe, device 31 is changed after activation of the operating system 22, or a case of transitioning to normal operation after recovery from a malfunction.

The function setting part 27 determines a driver (virtual driver 131) set in the virtual machine 10 and the control driver 262 used, based on the apparatus identification information and the function identification information that have been read, and makes the virtual driver 131 and the control driver 262 active. Specifically, the function setting part 27 sets and makes active the determined virtual driver 131 in the virtual driver management part 13 of the virtual machine 10. In addition, the function setting part 27 sets and makes active the determined control driver 262 in the driver management part 26.

(Connection Control Part 28)

The connection control part 28 receives, from the function setting part 27 a message giving an instruction for hot plugging to make the management part 20 recognize a function set in the PCIe device 31. On receiving the message with the instruction for hot plugging from the function setting part 27, the connection control part 28 starts hot plugging.

(PCIe Device 31)

Next, a detailed description is given concerning the PCIe device 31.

Figure 9:
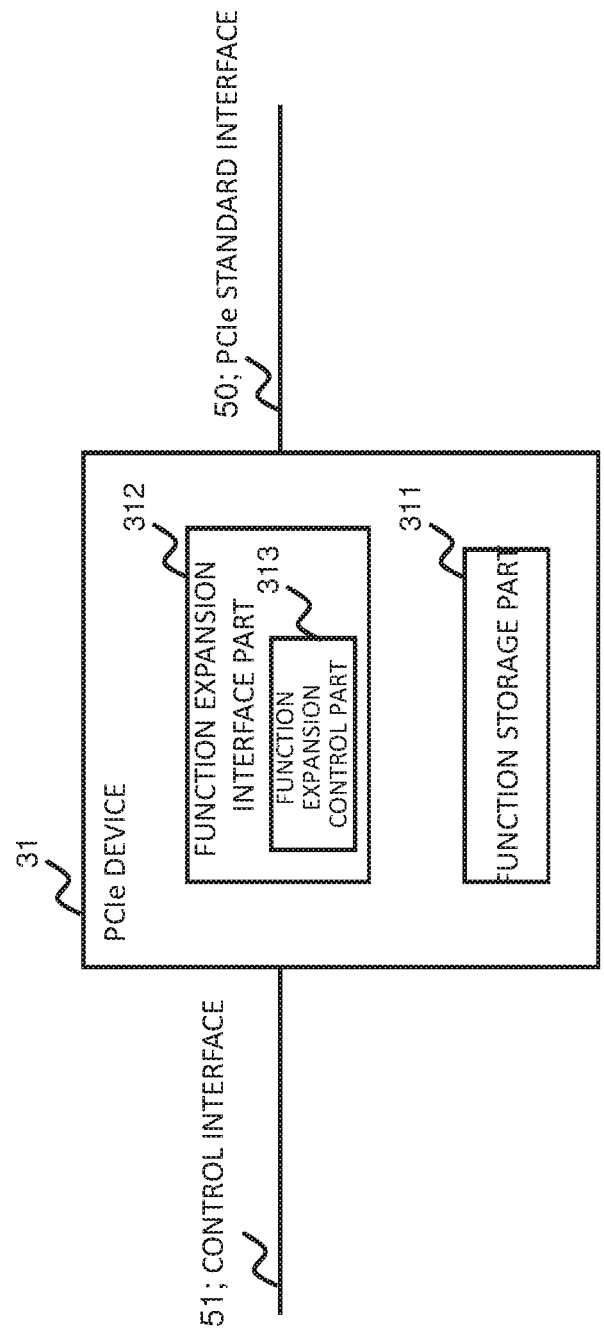
FIG. 9 is a block diagram showing an example of an internal configuration of a PCIe device 31.

FIG. 9 is a block diagram showing an example of an internal configuration of the PCIe device 31. The PCIe device 31 is configured to include a function storage part 311 and a function expansion interface part 312. The function expansion interface part 312 is configured to include a function expansion control part 313.

The function storage part 311 stores a function executed by the expansion apparatus 30 (specifically, the PCIe device 31). For example, the function storage part 311 may be a memory to store a program for implementing the function in question. The function storage part 311 may be implemented using a PLD (Programmable Logic Device). The function storage part 311 is a rewritable area. For example, the management part 20 may download a program to implement a function to be set, to the PCIe device 31, and may store the program in the function storage part 31.

The function expansion interface part 312 executes processing or data processing based on the PCIe device 31 standard.

The function expansion control part 313 is configured to include a storage area that stores information for causing the expansion apparatus 30 (specifically, the PCIe device 31) to operate. Specifically, the function expansion control part 313 is configured to include a Peripheral Component Interconnect (PCI) Configuration Space. For example, the function expansion control part 313 may be a register for storing information for causing the PCIe device 31 to operate, in conformity with a PCIe standard.

On receiving function identification information (Program-ID) from the function management part 25, the function expansion interface part 312 sets the received function identification information in the function expansion control part 313. On setting the function identification information (Program-ID) in the function expansion control part 313, the function expansion interface part 312 notifies the function management part 25 of completion of setting of the function identification information.

Figure 10:
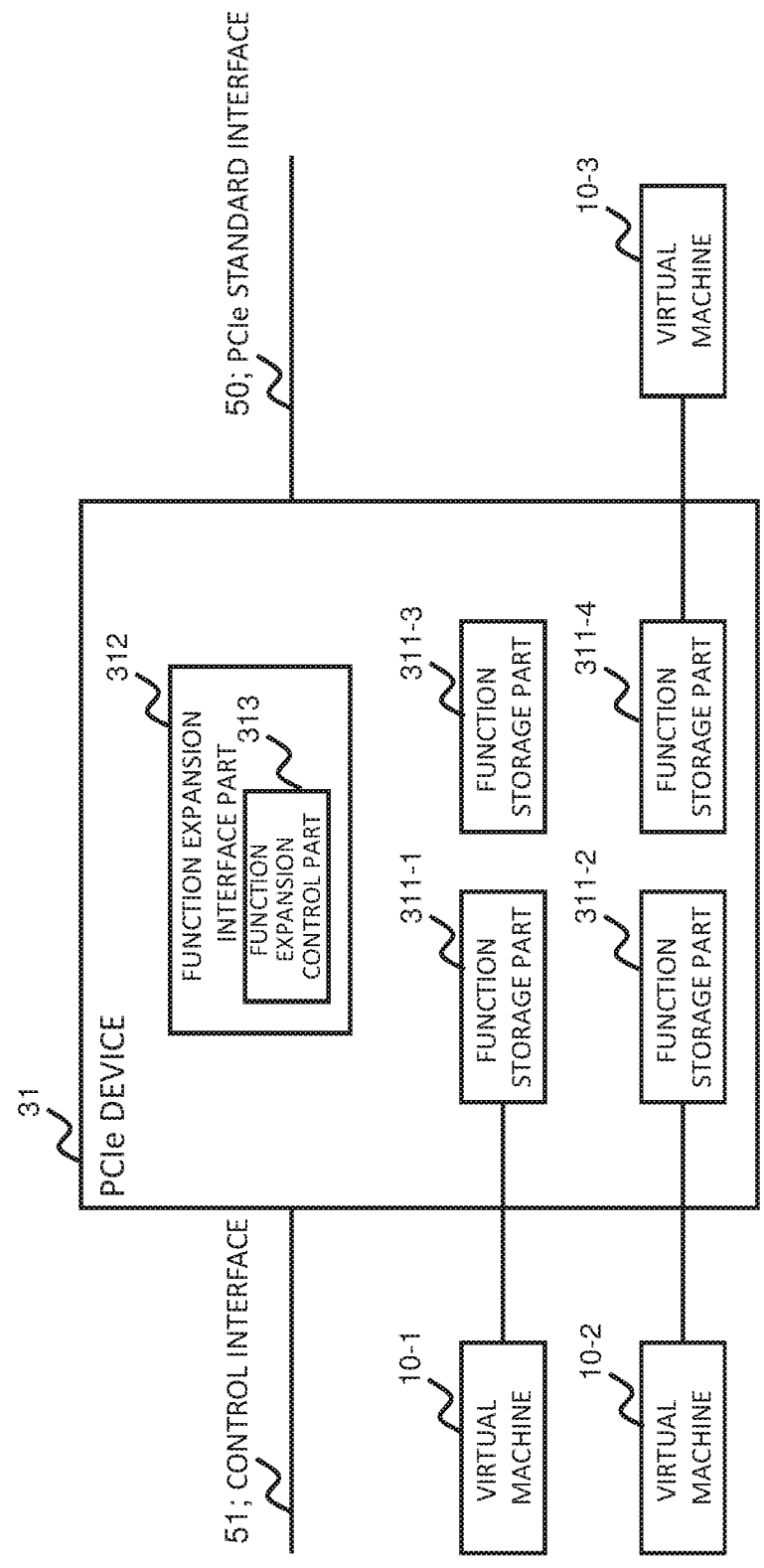
FIG. 10 is a block diagram showing an example of an internal configuration of a PCIe device 31.

FIG. 10 is a block diagram showing an example of a case where the PCIe device 31 is provided with a plurality of function storage parts (311-1-311-4). In the description below, the function storage parts (311-1-311-4) are denoted as function storage part 311 where there is no need to distinguish between them. It is to be noted that in FIG. 10, 4 of the function storage parts (311-1-311-4) are shown, but the number of function storage parts 311 provided by the PCIe device 31 is not limited to 4. There may be 1 or 2, or 5 or more of the function storage parts 311 provided by the PCIe device 31.

The function management part 25 notifies the function expansion interface part 312 of respective function identification information (Program-ID) items corresponding to functions set in the respective function storage parts 311. The function expansion interface part 312 sets the respective function identification information items (Program-ID) that have been received, in the function expansion control part 313.

By referring to the function identification information (Program-ID) set in the function expansion control part 313, the virtual machine 10 can distinguish each function set inside the PCIe device 31. As a result, the plurality of virtual machines 10 can utilize the respective functions set in the respective function storage parts 311. In other words, the plurality of virtual machines 10 can share a function set inside one PCIe device 31. It is to be noted that address setting and an access method for accessing the PCIe device 31 from the virtual machines 10 and the management part 20 may use SR-IOV (Single Root Input Output Virtualization), which is IO (Input Output) virtualization technology defined in the PCI standard.

For example, in a case where it is desired to have the same function in the PCIe device 31 of different providers (vendors), by setting the same function identification information (Program-ID) in each PCIe device 31, the functions can be the same even for PCIe devices 31 of different vendors.

Next a detailed description is given concerning processing to set the function identification information (Program-ID) in the function expansion control part 313, while referring to FIG. 11.

FIG. 11 is a diagram showing an example of a data structure stored in the function expansion control part 313. As shown in FIG. 11, the function expansion control part 313 is provided with a configuration in conformity with the PCI standard.

For example, the function management processing part 252 performs a configuration cycle, which is a device management process defined in the PCI standard, by using a Configuration Space Header of Type 0 prescribed in the PCI standard. In this case, the function management processing part 252 sets a Program-ID corresponding to a downloaded function, in Byte Offset 38h within a PCI configuration space shown in FIG. 11.

For example, the PCIe device 31 corresponds to a SR-IOV function, which is IO virtualization technology. In this case, the function management processing part 252 sets a Program-ID corresponding to a downloaded function, in an SR-IOV Extended Capabilities area of a PCI configuration space. In addition, the function management processing part 252 sets a Program-ID in an area assigned as Reserved with respect to the PCI standard, in a PCI configuration space.

It is to be noted that the function management processing part 252 may set the same value, as Program-ID, in an SR-IOV Extended Capabilities area and a Configuration Space Header area of Type 0 prescribed in the PCI standard, or different values may be set.

Next, a description is given concerning operations of the management system 1. It is to be noted that in the following description, an example is shown of a case in which the management part 20 newly activates a virtual machine 10, based on an instruction from an NFV control apparatus 60, but there is no limitation to operations of the management system 1 according to the present example embodiment. In the following description, an example is shown of a case in which the operating system 22 of the management part 20 is activated, based on an instruction from an NFV control apparatus 60, but this is not limited to operations of the management system 1 according to the present example embodiment.

Figure 12:
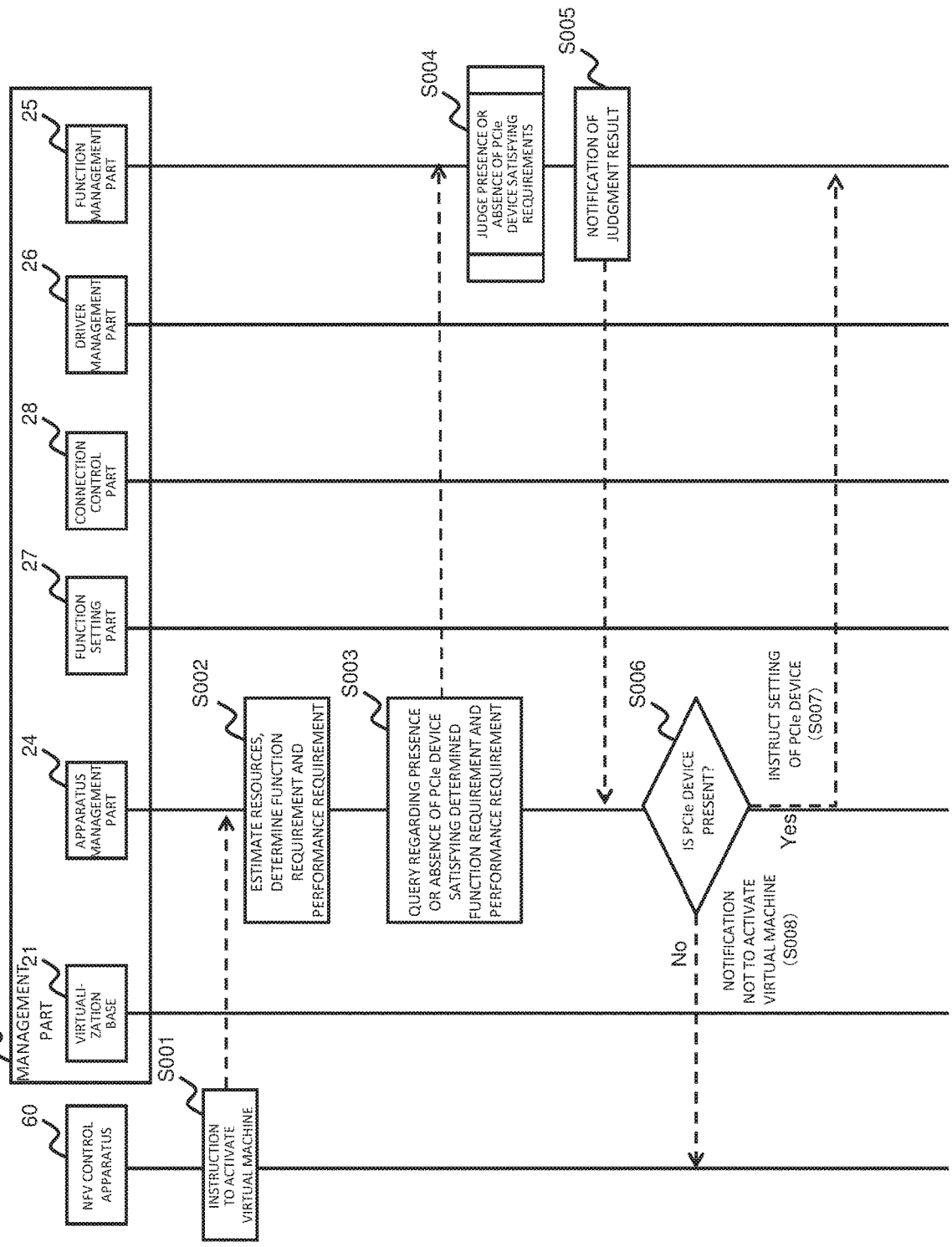
FIG. 12 is a sequence diagram showing an example of operations of a management system 1.

Referring to FIG. 12, a description is given concerning operations of the management system 1.

In step S001, the NFV control apparatus 60 transmits a message instructing activation of a virtual machine 10, to the apparatus management part 24 of the management part 20, via the network 70. On receiving a message from the NFV control apparatus 60, the management part 20 activates the operating system 22. It is to be noted that in the following description, the operating system 22 implements functions of the apparatus management part 24, the driver management part 26, the function setting part 27, and the connection control part 28. For example, in the following description, the device management software 23 implements a function of the function management part 25.

In step S002, the apparatus management part 24 estimates resources and determines a functional requirement and a performance requirement. Specifically, the apparatus management part 24 extracts the functional requirement and performance requirement necessary for the virtual machine 10 from the received message, and calculates various types of resource that are necessary. The apparatus management part 24 determines the functional requirement and performance requirement necessary for the virtual machine 10 for which an activation request has been received, based on a resource list 241 and a result of calculating resources.

In step S003, the apparatus management part 24 queries the function management part 25 with regard to presence or absence of a PCIe device 31 satisfying the determined functional requirement and performance requirement.

In step S004, the function management part 25 determines presence or absence of a PCIe device 31 satisfying the requirement. Specifically, the function management part 25 refers to the function management table 251, and judges whether or not a PCIe device 31 is present, satisfying the functional requirement and performance requirement determined by the apparatus management part 24.

Figure 13:
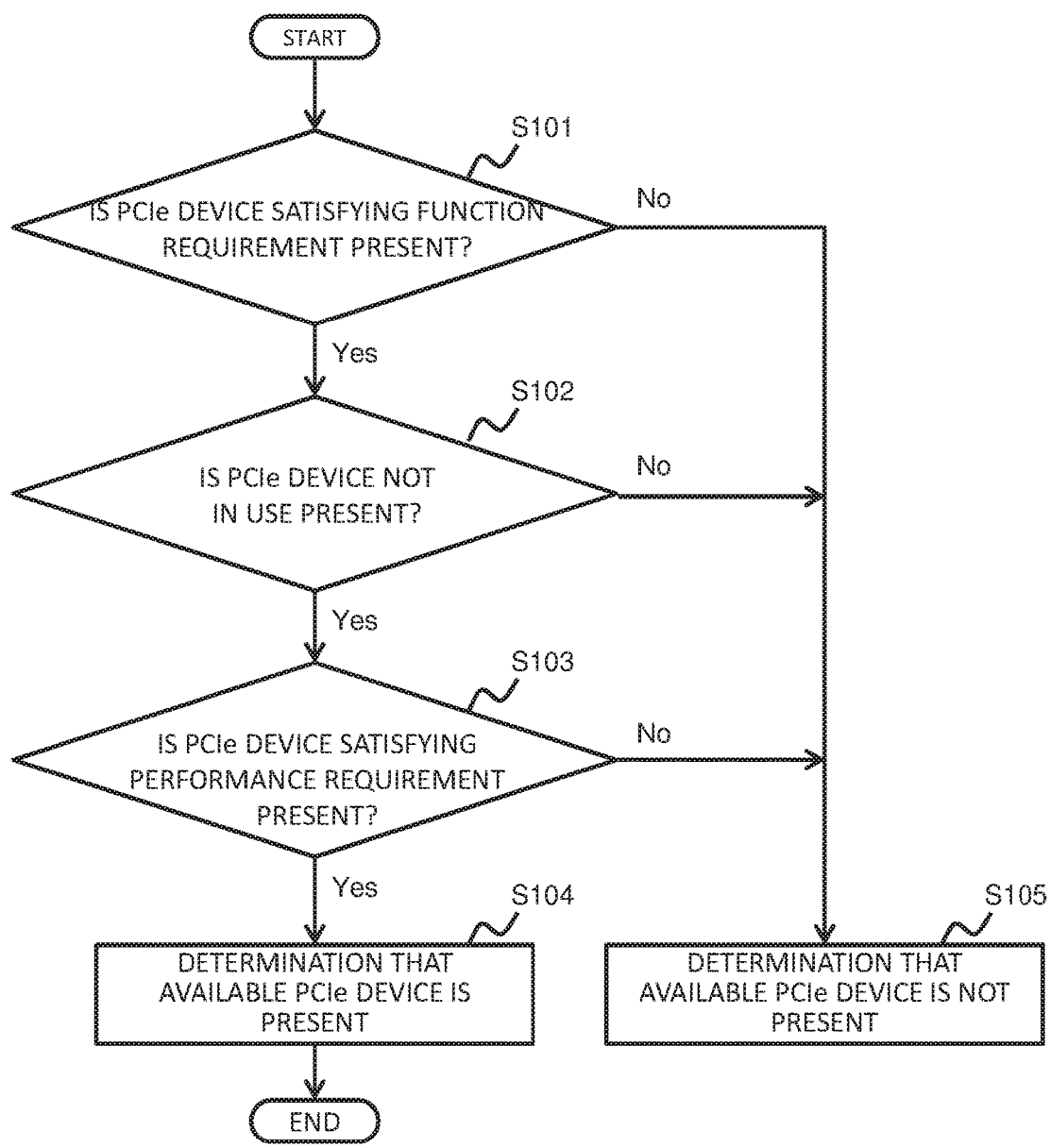
FIG. 13 is a flowchart showing an example of operations management system 1.

Here, a detailed description is given concerning processing to judge the presence or absence of the PCIe device 31, making reference to FIG. 13.

In step S101, the function management processing part 252 judges whether or not a PCIe device 31 satisfying a functional requirement is present. Specifically, the function management processing part 252 refers to the function management table 251, and judges whether or not a PCIe device 31 satisfying a functional requirement, for which a query has been received, is recorded. In a case where a PCIe device 31 satisfying the functional requirement is present (Yes branch in step S101), control transitions to step S102. On the other hand in a case where a PCIe device 31 satisfying the functional requirement is not present (No branch in step S101), control transitions to step S105.

In step S102, the function management processing part 252 judges whether or not a PCIe device 31 not being used is present. Specifically, the function management processing part 252 refers to the function management table 251, to judges whether or not a PCIe device 31 satisfying a functional requirement along with indicating "not being used", is recorded. In a case where a PCIe device 31 satisfying the functional requirement along with indicating "not being used", is present (Yes branch in step S102), control transitions to step S103. On the other hand, in a case where a PCIe device 31 satisfying the functional requirement is not present (No branch in step S101) along with indicating "not being used", control transitions to step S105.

In step S103, the function management processing part 252 judges whether or not a PCIe device 31 satisfying a performance requirement is present. Specifically, the function management processing part 252 refers to the function management table 251, to judge whether or not a PCIe device 31 satisfying a performance requirement along with satisfying a functional requirement and indicating "not being used", is recorded. In a case where a PCIe device 31 satisfying a performance requirement along with satisfying a functional requirement and indicating "not being used", is present (Yes branch in step S101), the function management processing part 252 judges that an available PCIe device 31 is present. On the other hand, in a case where a PCIe device 31 satisfying a performance requirement along with satisfying a functional requirement and indicating "not being used" is not present (No branch in step S101), a judgment is made that an available PCIe device 31 is not present.

It is to be noted that in a case where a PCIe device 31 that conforms to the functional requirement and performance requirement, for which a query has been received, is not present, the function management processing part 252 may perform download processing and update processing of a required program, for the PCIe device 31.

Here, a description is given concerning an example of processing to determine presence or absence of a PCIe device 31, making reference to the function management table 251 shown in FIG. 14. Specifically, a description is given exemplifying a case where a data encryption function (functional requirement) is provided, and a query is received from the function management processing part 252 concerning presence or absence of a PCIe device 31 by which 40 bit data can be processed in 1 second performance requirement). It is to be noted that in the following description, for convenience, in the function management table 251 shown in FIG. 14, function information=1 is taken to indicate a data encryption function. It is to be noted that in the following description, for convenience, in the function management table 251 shown in FIG. 14 a value indicated as performance information is taken as the number of data bits that can be processed per second. In the following description, for convenience, in the function management table 251 shown in FIG. 14, status information=1 is taken to indicate being in use. On the other hand, in the function management table 251 shown in FIG. 14, status information=0 is taken to indicate not being in use.

First, the function management processing part 252 refers to the function management table 251 to judge whether or not a PCIe device 31 with a data encryption function (that is, function information=1) is present. As a result, the function management processing part 252 judges that a PCIe device 31 corresponding to management numbers 0002, 0004 and 0006 shown in FIG. 14 satisfies the functional requirement, in the function management table 251.

Next, the function management processing part 252 refers to the function management table 251 to judge whether or not, among PCIe devices 31 corresponding to management numbers 0002, 0004 and 0006, a PCIe device 31 that is not being used is present. As a result, the function management processing part 252 judges that PCIe devices 31 corresponding to management numbers 0002 and 0006 are not being used.

Next, the function management processing part 252 refers to the function management table 251 to judge whether or not, among PCIe devices 31 corresponding to management numbers 0002 and 0006, a PCIe device 31 that can process 40 bit data in 1 second (that is, performance information=40) is present. As a result, the function management processing part 252 judges that the PCIe device 31 corresponding to management number 0002 can process 40 bit data in 1 second. The function management processing part 252 judges that an available PCIe device 31 is present.

Once again, referring to FIG. 12, a description is given concerning operations of the management system 1.

In step S005, the function management part 25 notifies the apparatus management part 24 of the judgement result. In a case of receiving a notification indicating that there is a PCIe device 31 present (Yes branch in step S006), the apparatus management part 24 instructs the function management part 25 to set the PCIe device 31 (S007). On the other hand, in a case of receiving a notification indicating that there is no PCIe device 31 present (No branch in step S006), the apparatus management part 24 notifies the NFV control apparatus 60 not to activate the virtual machine 10.

Figure 15:
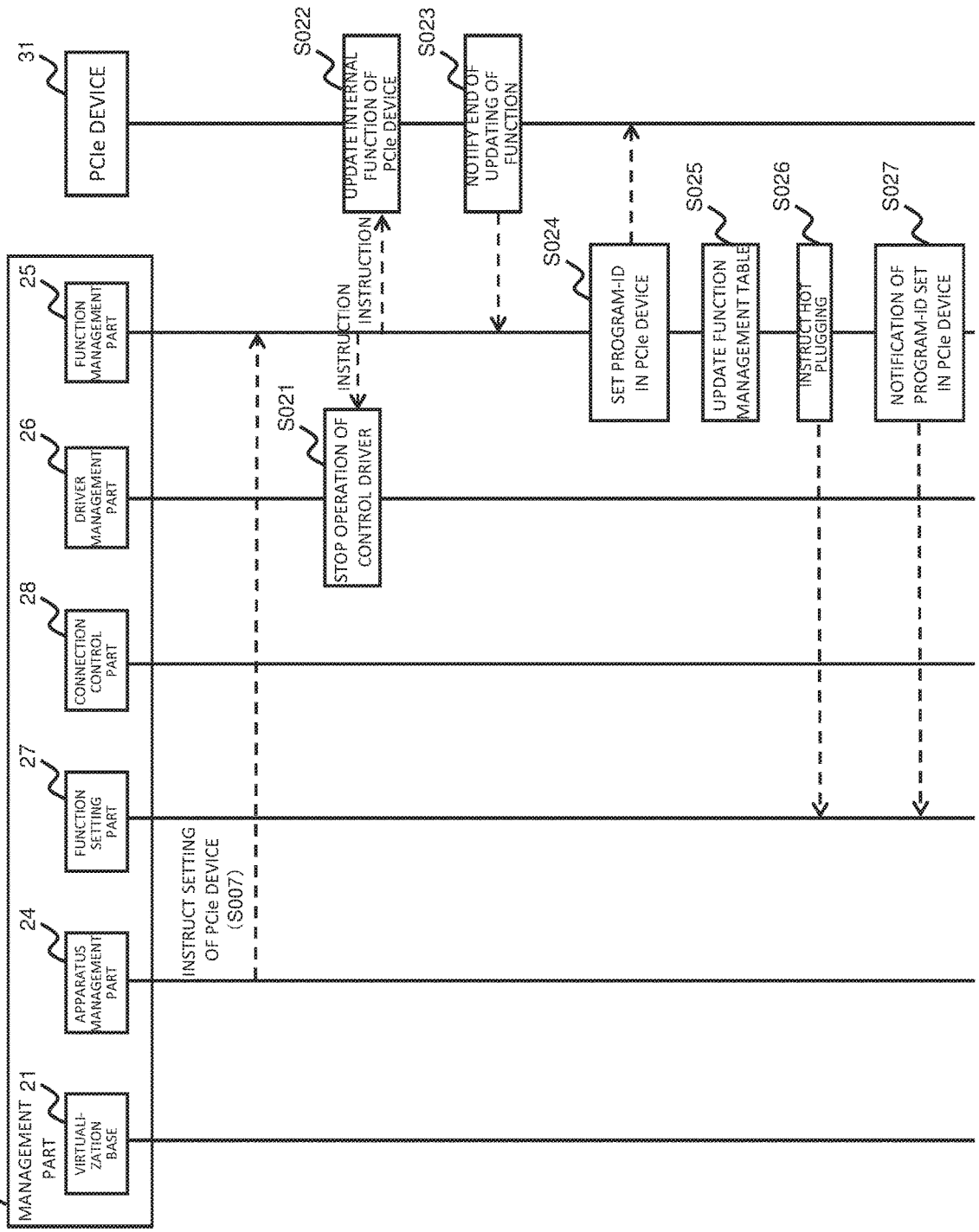
FIG. 15 is a sequence diagram showing an example of operations of a management system 1.

Next, referring to FIG. 15, a description is continued concerning operations of the management system 1. It is to be noted that the following description exemplifies a case where the function management processing part 252 refers to the function management table 251 shown in FIG. 14. In the following, the description indicates that the PCIe device 31 corresponding to management number 0002 shown in FIG. 14 satisfies a functional requirement and a performance requirement, and is not being used.

The apparatus management part 24, when the function management part 25 is instructed to set the PCIe device 31, confirms that a control driver 262 of the driver management part 26 is not operating. In a case where the control driver 262 of the driver management part 26 is operating, the function management part 25 instructs the driver management part 26 to stop operation of the control driver 262. The driver management part 26, on receiving an instruction to stop operation of the control driver 262, stops operation of the control driver 262 (step S021).

In a case where driver management part 26 stops operation of the control driver 262, the function management part 25 gives an instruction to update an internal function of the PCIe device 31. For example, in a case where the PCIe device 31 corresponding to management number 0002 satisfies a functional requirement and a performance requirement, and is not being used, an instruction is given to the PCIe device 31 to update an internal function of the PCIe device 31. It is to be noted that, as described above, in a case where necessary function setting is complete for the PCIe device 31, update processing of the internal function is clearly unnecessary.

On receiving an instruction to update an internal function, the PCIe device 31 updates an internal function of the PCIe device 31 (step S022). The PCIe device 31 gives notification of completion of updating the function to the function management part 25 (step S023).

In step S024, the function management part 25 sets function identification information (Program-ID) in the PCIe device 31 satisfying the functional requirement and performance requirement. For example, in a case where the PCIe device 31 corresponding to management number 0002 satisfies the functional requirement and the performance requirement, and is not being used, "2000" is set in the PCIe device 31 as the Program-ID. In a case where the function identification information (Program-ID) is set, the PCIe device 31 notifies the function management part 25 of completion of setting of the function identification information (Program-ID).

On receiving the notification of completion of setting of the function identification information (Program-ID), the function management part 25 updates the function management table 251 (step S025). Specifically, the function management part 25 updates status information of the corresponding PCIe device 31 to "being used", in the function management table 251. For example, in a case where setting of the function identification information (Program-ID) is completed for the PCIe device 31 corresponding to management number 0002, status information corresponding to management number 0002 is updated to "1" indicating being in use, in the function management table 251.

In step S026, the function management part 25 instructs hot plugging in the function setting part 27. In step S027, the function management part 25 gives notification of the function identification information (Program-ID) set in the PCIe device 31, to the function setting part 27. For example, the function management part 25 notifies the function setting part 27, of Program-ID "2000", set in the PCIe device 31 corresponding to management number 0002.

Figure 16:
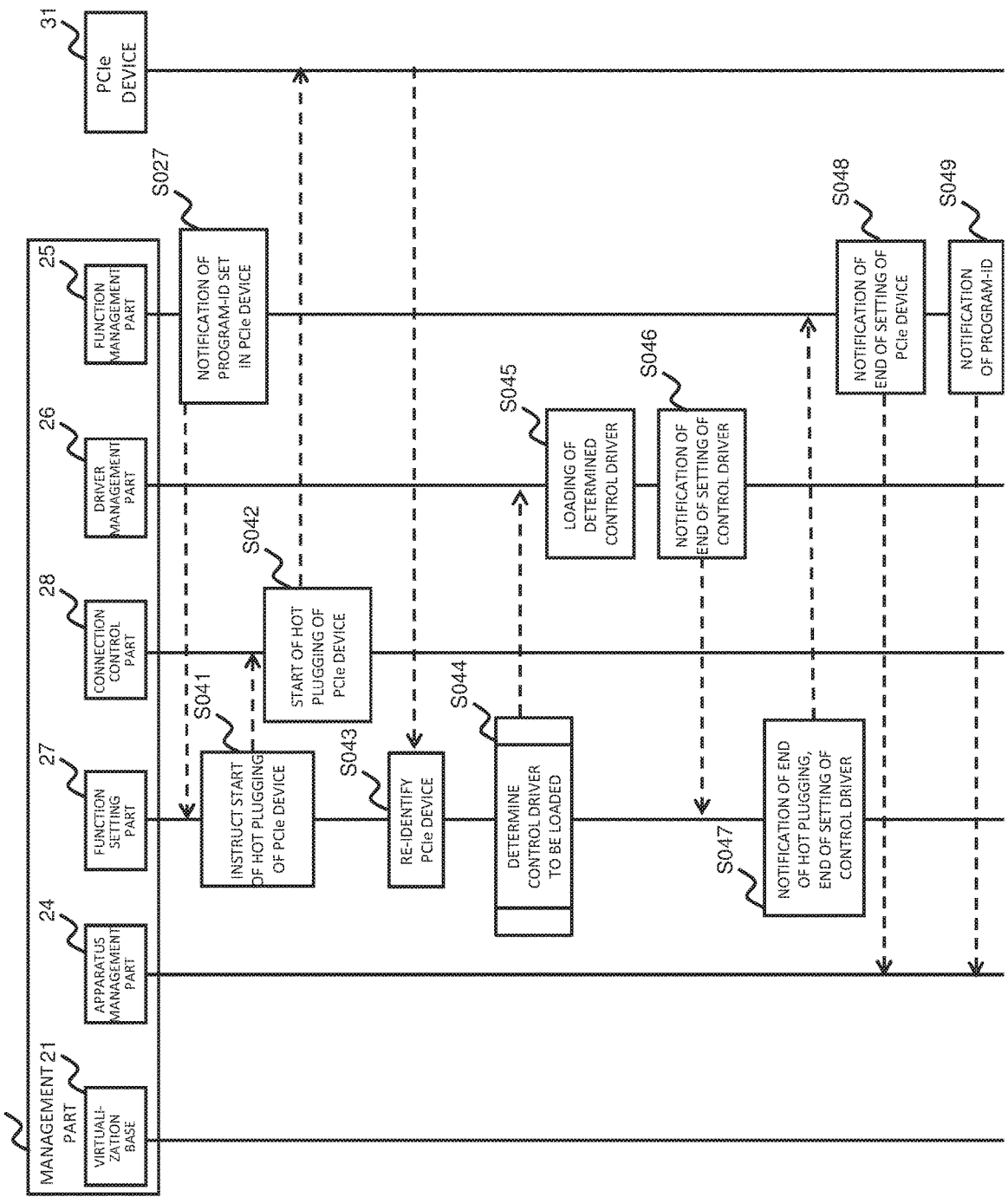
FIG. 16 is a sequence diagram showing an example of operations of the management system 1.

Next, referring to FIG. 16, the description is continued concerning operations of the management system 1.

When the function management part 25 gives notification of the function identification information (Program-ID) set in the PCIe device 31 (step S027), to the function setting part 27, the function setting part 27 instructs the connection control part 28 to start hot plugging of the PCIe device 31 (step S041). The connection control part 28 starts hot plugging of the PCIe device 31. The function setting part 27 executes re-identification of the PCIe device 31 by executing hot plugging (step S043).

In step S044 the function setting part 27 determines the control driver 262 loaded in the driver management part 26. Details of the processing of determining the control driver 262 are described later.

In step S045, the driver management part 26 loads the control driver 262 determined by the function setting part 27. The driver management part 26, on completing loading of the control driver 262, gives notification to the function setting part 27, of completion of setting the control driver 262 (step S046).

In step S047 the function setting part 27 gives notification to the function management part 25 of completion of hot plugging and completion of the control driver 262. The function management part 25 gives notification to the apparatus management part 24 of completion of setting of the PCIe device 31 (step S048). The function management part 25 gives notification to the apparatus management part 24 of the function identification information (Program-ID) set in the PCIe device 31 (step S049).

For example, the function management part 25 transmits a message indicating that setting of the PCIe device 31 corresponding to management number 0002 has been completed, to the apparatus management part 24. The function management part 25 gives notification of the apparatus management part 24 of the Program-ID "2000".

Figure 17:
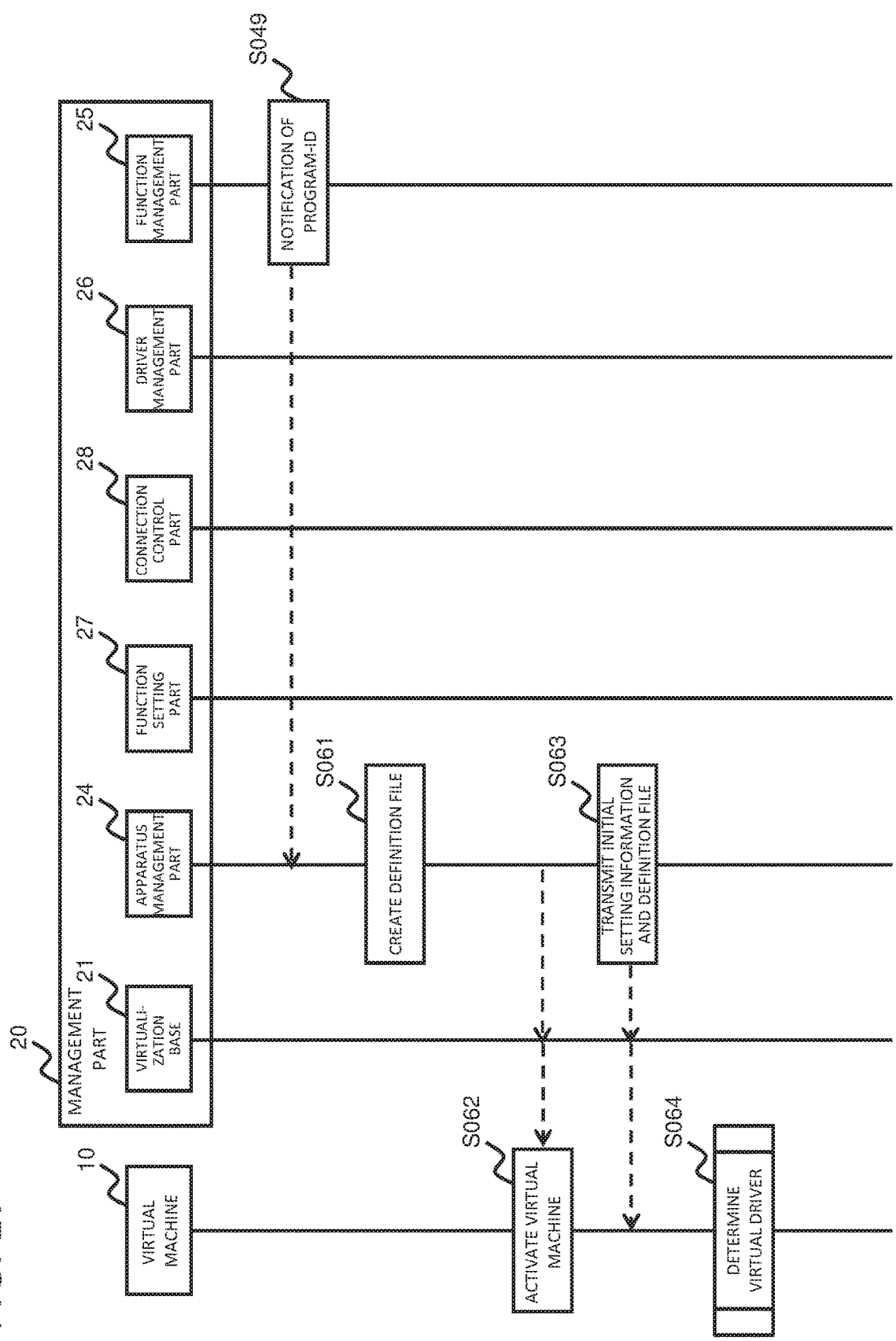
FIG. 17 is a sequence diagram showing an example of operations of the management system 1.

Next, referring to FIG. 17, the description is continued concerning operations of the management system 1.

When the function management part 25 gives notification to the apparatus management part 24 of the function identification information (Program-ID) set in the PCIe device 31, the apparatus management part 24 creates a definition file (step S061). Specifically, the apparatus management part 24 refers to the virtual machine management table 242, to create a definition file necessary for activating the virtual machine 10.

When creation of the definition file is completed, the apparatus management part 24 activates the virtual machine 10 via the virtualization base 21 (step S062). On activating the virtual machine 10, the apparatus management part 24 transmits initial setting information and the definition file to the virtual machine 10 (step S063).

The virtual machine 10 sets information necessary for causing the virtual machine to operate, based on the received initial setting information and the definition file. The virtual machine 10 determines a virtual driver 131 for using the PCIe device 31 (step S064).

Figure 18:
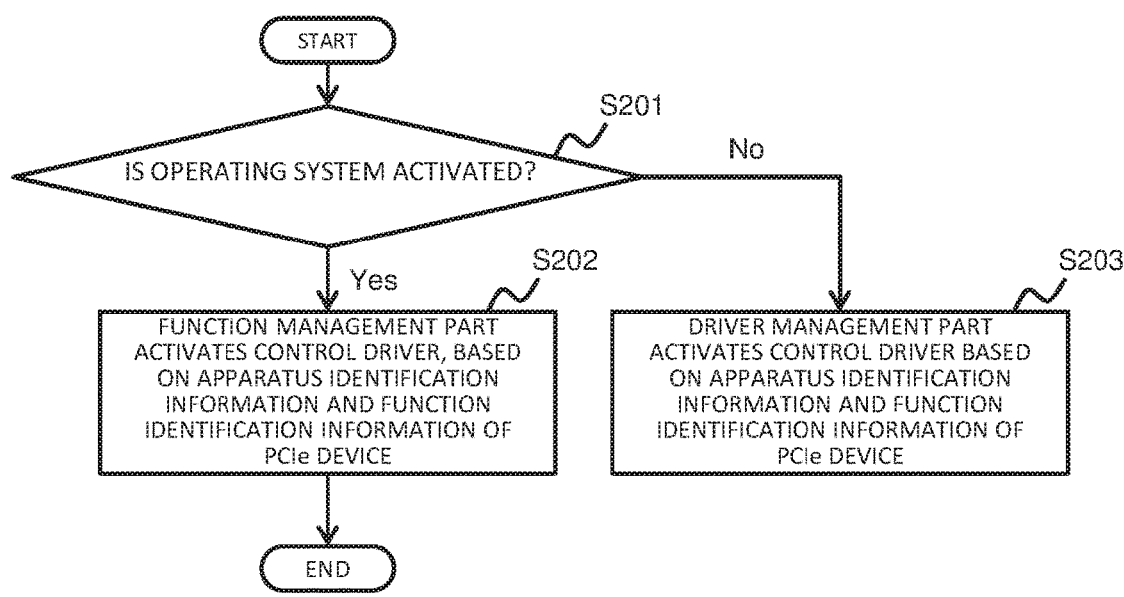
FIG. 18 is a flowchart showing an example of operations of the management system 1.

Next, a description is given concerning processing to determine the control driver 262, making reference to FIG. 18.

In step S201, the function management part 25 judges whether or not the operating system 22 of the management part 20 is activated.

In a case where the operating system 22 of the management part 20 is activated (Yes branch in step S201), the function management part 25 activates the control driver 262 based on apparatus identification information and apparatus identification information of the PCIe device 31 (step S202). Specifically, the function management part 25 reads the apparatus identification information and the function identification information from the PCIe device 31 connected to the management part 20. The function management part 25 determines and activates the control driver 262 to be loaded, based on the apparatus identification information and the function identification information.

On the other hand, in a case where the operating system 22 of the management part 20 is not activated (No branch in step S201), the driver management part 26 activates the control driver 262 based on apparatus identification information and apparatus identification information of the PCIe device 31 (step S203). Specifically, the driver management part 26 reads the apparatus identification information and the function identification information from the PCIe device 31 connected to the management part 20. The driver management part 26 determines and activates the control driver 262 to be loaded, based on the apparatus ide information and the function identification information.

Since the processing to determine the virtual driver 131 is similar to the processing to determine the control driver 262 shown in FIG. 18, a detailed description is omitted. It is to be noted that the abovementioned description concerns processing to determine the virtual driver 131 after activating the virtual machine 10. However, this is not limited to operation of the management system 1 according to the present example embodiment. For example, the function setting part 27 may determine the control driver 262 and the virtual driver 131 before the virtual machine 10 is activated. The apparatus management part 24 may give notification of the initial setting information and the virtual driver 131 to the virtual machine 10.

As described above, the management system 1 according to the present example embodiment contributes to facilitating functional expansion of the virtual machine 10, for a general purpose server, by using a PCIe device 31, which can rapidly and flexibly change an internal function.

In the management system 1 according to the present example embodiment, the management part 20 sets function identification information in the PCIe device 31. As described above, the function identification information is information to distinguish functions set within a PCIe device 31. In the management system 1 according to the present example embodiment, one data item in a tabular format associating apparatus identification information and function identification information identifying PCIe device 31, is recorded in the management part 20. Thus, the management system 1 according to the present example embodiment contributes to facilitating management of correspondence of function identification information and apparatus identification information for a PCIe device 31.

Here, the management system 1 according to the present example embodiment may associate a plurality of function identification information items with one apparatus identification information item. As a result, the management system 1 according to the present example embodiment, in a case where a plurality of internal functions are set in one PCIe device 31, contributes to facilitating management of a plurality of internal functions that have been set in one PCIe device 31.

The management system 1 according to the present example embodiment may associate a plurality of function identification information items with one apparatus identification information item. As a result, for a plurality of PCIe devices 31 provided with the same functions, the management system 1 according to the present example embodiment contributes to facilitating management of the PCIe devices 31 in a state where functions are shared.

Some or all of the abovementioned example embodiments may also be described in, but are limited to, the following modes.

(Mode 1)
As in the management apparatus according to the first aspect described above.

(Mode 2)
The management apparatus wherein
the function management table further associates the function identification information, title of program data, and function information indicating processing in which the program data is executed, with the apparatus identification information, and performs storage thereof; and
the function management part refers to the function management table to specify function information satisfying a designated functional requirement, specify the expansion apparatus based on apparatus identification information corresponding to the function information, and set the function identification information, specified in the specified expansion unit, and a function satisfying the functional requirement, in the expansion unit.

(Mode 3)
The management apparatus determines a first driver set in the virtual machine, based on the function identification information, set in the expansion apparatus satisfying the functional requirement, and a second driver that enables the virtual machine to use an internal function of the expansion unit.

(Mode 4)
The management apparatus wherein the function management table further associates status information indicating whether or not the virtual machine is using an expansion apparatus corresponding to the apparatus identification information, with the apparatus identification information, and performs storage thereof; and the function management part specifies an expansion apparatus corresponding to the function information, and indicating a state in which the status information is not being used.

(Mode 5)
The management apparatus wherein the function management table further associates the function identification information, title of program data, the function information, and performance information indicating performance necessary for executing the program data, additionally with the apparatus identification information, and performs storage thereof; and the function management part refers to the function management table to specify function information and performance information satisfying a functional requirement and performance requirement of the virtual machine, specify the apparatus identification information corresponding to the specified function information and the specified performance information, specify the expansion apparatus based on the apparatus identification information, and set the function identification information and a function satisfying the functional requirement, as the internal function, in the expansion unit.

(Mode 6)
The management apparatus wherein the function management part specifies an expansion apparatus corresponding to the function information and the performance information, and indicating a state in which the status information is not being used.

(Mode 7)
The management apparatus wherein the function setting part creates a definition file necessary for activating the virtual machine; the management apparatus includes an apparatus management part that activates the virtual machine based on the definition file created by the function setting part, and the definition file includes the function identification information set in the expansion unit, used by a virtual machine that is to be activated.

(Mode 8)
As in the management system according to the second aspect described above.

(Mode 9)
The management system wherein the expansion apparatus is connected to the management apparatus, via a PCIe interface.

(Mode 10)
The management system wherein the function management part sets the function identification information in an empty area satisfying a prescribed condition, in the storage area of the function expansion control part.

(Mode 11)
As in the control method of the management apparatus according to the third aspect described above.
(Mode 12)
The control method for a management apparatus, comprising: associating the function identification information, title of program data, and function information indicating processing in which the program data is executed, with the apparatus identification information, and performing storage thereof; specifying function information satisfying a designated functional requirement; specifying the expansion apparatus based on apparatus identification information corresponding to the function information; and setting the function identification information, specified in the specified expansion unit, and a function satisfying the functional requirement, in the expansion unit.
(Mode 13)
The control method for a management apparatus comprising: determining a first driver set in the virtual machine, based on the function identification information, set in the expansion apparatus satisfying a functional requirement, and a second driver that enables the virtual machine to use an internal function of the expansion unit.
(Mode 14)
The control method for a management apparatus comprising: associating status information indicating whether or not the virtual machine is using an expansion apparatus corresponding to the apparatus identification information, with the apparatus identification information, and performing storage thereof; and specifying an expansion apparatus corresponding to the function information, and indicating a state in which the status information is not being used.
(Mode 15)
The control method for a management apparatus comprising: storing information associating the function identification information, title of program data, function information, and performance information indicating performance necessary for executing the program data, additionally with the apparatus identification information; specifying function information and performance information satisfying a functional requirement and performance requirement of the virtual machine, specifying the apparatus identification information corresponding to the specified function information and the specified performance information; specifying the expansion apparatus based on the apparatus identification information, and setting the function identification information and a function satisfying the functional requirement, as the internal function, in the expansion unit.
(Mode 16)
The control method for a management apparatus comprising: specifying an expansion apparatus corresponding to the function information and the performance information, and indicating a state in which the status information is not being used.
(Mode 17)
The control method for a management apparatus comprising: creating a definition file necessary for activating the virtual machine, and activating the virtual machine based on the created definition file, wherein the definition file includes the function identification information set in the expansion unit, used by a virtual machine that is to be activated.
(Mode 18)
As in the program according to the fourth aspect described above.
(Mode 19)
The program, causing a management apparatus to execute processing comprising: associating the function identification information, title of program data, and function information indicating processing in which the program data is executed, with apparatus identification information, and performing storage thereof; specifying function information satisfying a designated functional requirement, specifying the expansion apparatus based on apparatus identification information corresponding to the function information; and setting the function identification information, specified in the specified expansion unit, and a function satisfying the functional requirement, in the expansion unit.
(Mode 20)
The program, causing a management apparatus to execute processing comprising determining a first driver set in the virtual machine, based on the function identification information, set in the expansion apparatus satisfying a functional requirement, and a second driver that enables the virtual machine to use an internal function of the expansion unit.
(Mode 21)
The program, causing a management apparatus to execute processing comprising: associating status information indicating whether or not the virtual machine is using an expansion apparatus corresponding to the apparatus identification information, with the apparatus identification information, and performing storage thereof; and specifying an expansion apparatus corresponding to the function information, and indicating a state in which the status information is not being used.
(Mode 22)
The program, causing a management apparatus to execute processing comprising: storing information associating the function identification information, title of program data, function information and performance information indicating performance necessary for executing the program data, additionally with apparatus identification information; specifying function information and performance information satisfying a functional requirement and performance requirement of the virtual machine, specifying the apparatus identification information corresponding to the specified function information and the specified performance information, specifying the expansion apparatus based on the apparatus identification information, and setting the function identification information and a function satisfying the functional requirement, as the internal function, in the expansion unit.
(Mode 23)
The program, causing a management apparatus to execute processing comprising: specifying an expansion apparatus corresponding to the function information and the performance information, and indicating a state in which the status information is not being used.
(Mode 24)
The program, causing a management apparatus to execute processing comprising: creating a definition file necessary for activating the virtual machine, and activating the virtual machine based on the created definition file, wherein the definition file includes the function identification information set in the expansion unit, used by a virtual machine that is to be activated.

The mode illustrated in the abovementioned mode 8 may be extended with regard to modes 2 to 7, similar to the mode illustrated in mode 1.

It is to be noted that the various disclosures of the abovementioned. Patent Literature are incorporated herein by reference thereto. Modifications and adjustments of example embodiments are possible within the bounds of the entire disclosure (including the scope of the claims) of the present invention, and also based on fundamental technological concepts thereof. Furthermore, various combinations and selections of various disclosed elements (including respective elements of the respective claims, respective elements of the respective example embodiments, respective elements of the respective drawings, and the like) are possible within the scope of the entire disclosure of the present invention. That is, the present invention clearly includes every type of transformation and modification that a person skilled in the art can realize according to the entire disclosure including the scope of the claims and to technological concepts thereof. In particular, with regard to numerical ranges described in the present specification, arbitrary numerical values and small ranges included in the relevant ranges should be interpreted to be specifically described even where there is no particular description thereof.

REFERENCE SIGNS LIST 1 management system
10, 10-1-10-3, 1020, 1020-1-1020-3 virtual machine
11, 11-1-11-3 application software
12, 12-1-12-3 management processing part
13, 13-1-13-3 virtual driver management part
20 management part
21 virtualization base
22 operating system
23 device management software
24 apparatus management part
25, 1002 function management part
26 driver management part
27, 1003 function setting part
28 connection control part
30, 30-1-30-6, 1010, 1010-1-1010-3 expansion apparatus
31, 31-1 31-3 PCIe device
40 bridge device
50 PCIe standard interface
51 control interface
60 NFV control apparatus
70 network
131, 131-1-131-3 virtual driver
241 resource list
242 virtual machine management table
243 apparatus management processing part
251 function management table
252 function management processing part
261 driver management processing part
262, 262-1-262-3 control driver
311, 311-1-311-4 function storage part
312 function expansion interface part
313 function expansion control part
1000 management apparatus
1001 data holding part

The invention claimed is:

1. A management apparatus connected to one or more expansion apparatuses in which an internal function can be changed, and to one or more virtual machines that use the internal function of the expansion unit, the apparatus comprising:
a memory configured to store a plurality of instructions
a processor configured to execute the plurality of instructions comprising:
a data holding part that holds a function management table for storing information associating apparatus identification information identifying the expansion apparatus and function identification information for identifying a function that is set in the expansion unit;
a function management part that specifies an expansion apparatus used by the virtual machine in response to an instruction to start up the virtual machine, that sets, in the expansion unit, function identification information corresponding to a function satisfying a functional requirement of the virtual machine, that sets the function satisfying the functional requirement as the internal function in the expansion unit, and that stores the function identification information in the function management table; and
a function setting part that determines a driver software necessary for an internal function of the expansion apparatus based on function identification information set in the expansion unit.

2. The management apparatus according to claim 1, wherein
the function management table further associates the function identification information, title of program data, and function information indicating processing in which the program data is executed, with the apparatus identification information, and performs storage thereof; and
the function management part refers to the function management table to specify function information satisfying a designated functional requirement, specify the expansion apparatus based on apparatus identification information corresponding to the function information, and set the specified function identification information, and a function satisfying the functional requirement, in the expansion unit.

3. The management apparatus according to claim 1, wherein the management apparatus determines a first driver set in the virtual machine, based on the function identification information, set in the expansion apparatus satisfying the functional requirement, and a second driver that enables the virtual machine to use an internal function of the expansion unit.

4. The management apparatus according to claim 1, wherein
the function management table further associates status information indicating whether or not the virtual machine is using an expansion apparatus corresponding to the apparatus identification information, with the apparatus identification information, and performs storage thereof; and
the function management part specifies an expansion apparatus corresponding to the function information, and indicating a state in which the status information is not being used.

5. The management apparatus according to claim 1, wherein
the function management table further associates the function identification information, title of program data, the function information, and performance information indicating performance necessary for executing the program data, additionally with the apparatus identification information, and performs storage thereof; and
the function management part refers to the function management table to specify function information and performance information satisfying a functional requirement and performance requirement of the virtual machine, specify the apparatus identification information corresponding to the specified function information and the specified performance information, specify the expansion apparatus based on the apparatus identification information, and set the function identification information and a function satisfying the functional requirement, as the internal function, in the expansion unit.

6. The management apparatus according to claim 1, wherein the function management part specifies an expansion apparatus corresponding to the function information and the performance information, and indicating a state in which the status information is not being used.

7. The management apparatus according to claim 1, wherein
the function setting part creates a definition file necessary for activating the virtual machine;
the management apparatus comprises an apparatus management part that activates the virtual machine based on the definition file created by the function setting part; and
the definition file comprises the function identification information set in the expansion unit, used by a virtual machine that is to be activated.

8. A management system configured by comprising:
one or more expansion apparatuses in which an internal function can be changed;
one or more virtual machines that use the internal function of the expansion unit; and
a management apparatus connected to the expansion apparatus and the virtual machine;
wherein the expansion apparatus comprises:
a function expansion control part including a storage area for storing information for causing the expansion apparatus to operate; and
a function storage part in which a function executed by the expansion apparatus is stored;
the management apparatus comprises:
a data holding part that holds a function management table for storing information associating apparatus identification information identifying the expansion apparatus and function identification information for identifying a function that is set in the expansion unit;
a function management part that specifies an expansion apparatus used by the virtual machine, in response to an instruction to start up the virtual machine, that sets, in the expansion unit, function identification information corresponding to a function satisfying a functional requirement for the virtual machine, that sets the function satisfying the functional requirement as the internal function in the expansion unit, and that stores the function identification information in the function management table; and
a function setting part that determines a driver software necessary for the internal function of the expansion apparatus based on the function identification information set in the expansion unit.

9. The management system according to claim 8, wherein the expansion apparatus is connected to the management apparatus, via a PCIe interface.

10. The management system according to claim 8, wherein the function management part sets the function identification information in an empty area satisfying a prescribed condition, in the storage area of the function expansion control part.

11. A control method for a management apparatus connected to one or more expansion apparatuses in which an internal function can be changed, and one or more virtual machines that use the internal function of the expansion unit, the method comprising:

storing information associating apparatus identification information identifying the expansion apparatus and function identification information for identifying a function that is set in the expansion unit;
specifying an expansion apparatus used by the virtual machine, in response to an instruction to start up the virtual machine;
setting, in the expansion unit, the function identification information, corresponding to a function satisfying a functional requirement of the virtual machine;
setting a function satisfying the functional requirement as the internal function in the expansion unit;
storing the function identification information in the function management table; and
determining a driver software necessary for the internal function of the expansion apparatus based on the function identification information that has been set in the expansion unit.

12. The control method for a management apparatus, according to claim 11, comprising:
associating the function identification information, title of program data, and function information indicating processing in which the program data is executed, with the apparatus identification information, and performing storage thereof;
specifying function information satisfying a designated functional requirement;
specifying the expansion apparatus based on apparatus identification information corresponding to the function information; and
setting the function identification information, specified in the specified expansion unit, and a function satisfying the functional requirement, in the expansion unit.

13. The control method for a management apparatus according to claim 11, the method determining a first driver set in the virtual machine, based on the function identification information, set in the expansion apparatus satisfying a functional requirement, and a second driver that enables the virtual machine to use an internal function of the expansion unit.

14. The control method for a management apparatus according to claim 11, comprising:
associating status information indicating whether or not the virtual machine is using an expansion apparatus corresponding to the apparatus identification information, with the apparatus identification information, and performing storage thereof; and
specifying an expansion apparatus corresponding to the function information, and indicating a state in which the status information is not being used.

15. The control method for a management apparatus according to claim 11, comprising:
storing information associating the function identification information, title of program data, function information, and performance information indicating performance necessary for executing the program data, additionally with the apparatus identification information;
specifying function information and performance information satisfying a functional requirement and performance requirement of the virtual machine;
specifying the apparatus identification information corresponding to the specified function information and the specified performance information;
specifying the expansion apparatus based on the apparatus identification information; and setting the function identification information and a function satisfying the functional requirement, as the internal function, in the expansion unit.

16. The control method for a management apparatus according to claim 11, comprising:
specifying an expansion apparatus corresponding to the function information and the performance information, and indicating a state in which the status information is not being used.

17. The control method for a management apparatus according to claim 11, comprising:
creating a definition file necessary for activating the virtual machine; and
activating the virtual machine based on the created definition file; wherein
the definition file includes the function identification information set in the expansion unit, used by a virtual machine that is to be activated.

* * * * *